United States Patent
Aoki et al.

(10) Patent No.: US 10,654,353 B2
(45) Date of Patent: May 19, 2020

(54) VEHICLE, AND METHOD OF CONTROLLING VEHICLE

(71) Applicant: TOYOTA JIDOSHA KABUSHIKI KAISHA, Toyota-shi, Aichi-ken (JP)

(72) Inventors: Kazuma Aoki, Shizuoka-ken (JP); Tatsuya Imamura, Okazaki (JP); Yasuhiro Oshiumi, Gotemba (JP); Yukari Okamura, Gotemba (JP); Yuji Iwase, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/149,845

(22) Filed: Oct. 2, 2018

(65) Prior Publication Data
US 2019/0184806 A1 Jun. 20, 2019

(30) Foreign Application Priority Data
Dec. 20, 2017 (JP) .................................. 2017-243536

(51) Int. Cl.
*B60K 6/365* (2007.10)
*B60W 20/30* (2016.01)
(Continued)

(52) U.S. Cl.
CPC ............... *B60K 6/365* (2013.01); *B60K 1/00* (2013.01); *B60K 1/02* (2013.01); *B60K 6/387* (2013.01); *B60K 6/445* (2013.01); *B60W 10/02* (2013.01); *B60W 10/06* (2013.01); *B60W 10/08* (2013.01); *B60W 20/20* (2013.01); *B60W 20/30* (2013.01); *B60W 20/40* (2013.01); *F16H 3/728* (2013.01); *B60K 6/52* (2013.01); *B60K 2001/001* (2013.01); *B60K 2006/381* (2013.01); *B60W 10/115* (2013.01); *B60W 10/182* (2013.01); *B60W 30/1884* (2013.01); *B60W 2710/021* (2013.01); *B60W 2710/065* (2013.01); *B60W 2710/0644* (2013.01); *B60W 2710/081* (2013.01); *B60W 2710/083* (2013.01); *B60Y 2400/42* (2013.01); *B60Y 2400/73* (2013.01); *F16H 3/54* (2013.01);
(Continued)

(58) Field of Classification Search
CPC ....... B60K 6/365; B60K 6/445; B60W 20/30; F16H 3/728
See application file for complete search history.

(56) References Cited

U.S. PATENT DOCUMENTS 10,093,165 B2 * 10/2018 Imamura ............... B60W 20/14
2008/0120001 A1 5/2008 Heap
(Continued)

FOREIGN PATENT DOCUMENTS

EP 3222455 A2 9/2017
JP 2017-007437 A 1/2017

*Primary Examiner* — Derek D Knight
(74) *Attorney, Agent, or Firm* — Sughrue Mion, PLLC

(57) ABSTRACT

A vehicle includes an engine, a transmission mechanism, and an electronic control unit. The electronic control unit performs first switching control when there is a request for switching from a low mode to a high mode. The first switching control is to release a first engagement mechanism, and switch a second engagement mechanism to an engaged state when a difference between input and output rotational speeds of the second engagement mechanism becomes equal to or smaller than a permissible value.

18 Claims, 25 Drawing Sheets

(51) Int. Cl.

| | |
|---|---|
| *B60K 6/445* | (2007.10) |
| *F16H 3/72* | (2006.01) |
| *B60W 10/02* | (2006.01) |
| *B60K 1/00* | (2006.01) |
| *B60W 20/40* | (2016.01) |
| *B60W 20/20* | (2016.01) |
| *B60K 1/02* | (2006.01) |
| *B60W 10/06* | (2006.01) |
| *B60W 10/08* | (2006.01) |
| *B60K 6/387* | (2007.10) |
| *B60W 10/18* | (2012.01) |
| *B60W 10/115* | (2012.01) |
| *B60W 30/188* | (2012.01) |
| *B60K 6/52* | (2007.10) |
| *B60K 6/38* | (2007.10) |
| *F16H 3/54* | (2006.01) |

(52) U.S. Cl.
CPC ................ *F16H 2200/0034* (2013.01); *F16H 2200/2005* (2013.01); *F16H 2200/2007* (2013.01); *F16H 2200/2035* (2013.01)

(56) References Cited

U.S. PATENT DOCUMENTS

| | | |
|---|---|---|
| 2010/0029429 A1 | 2/2010 | Ota |
| 2010/0081533 A1 | 4/2010 | Lee et al. |
| 2016/0368361 A1 | 12/2016 | Endo et al. |

\* cited by examiner

FIG. 4

| TRAVELING MODE | | | CL1 | CL2 | B1 | MG1 | MG2 | ENG |
|---|---|---|---|---|---|---|---|---|
| HV TRAVELING MODE | HV-Lo MODE | | ● | — | — | G | M | ON |
| | HV-Hi MODE | | — | ● | — | G | M | ON |
| | DIRECT-COUPLING MODE | | ● | ● | — | | M | ON |
| EV TRAVELING MODE | DUAL MODE | EV-Lo MODE | — | — | ● | M | M | OFF |
| | | EV-Hi MODE | — | ● | ● | M | M | OFF |
| | SINGLE MODE | | — | — | — | | M | OFF |

VEHICLE, AND METHOD OF CONTROLLING VEHICLE

INCORPORATION BY REFERENCE

The disclosure of Japanese Patent Application No. 2017-243536 filed on Dec. 20, 2017 including the specification, drawings and abstract is incorporated herein by reference in its entirety.

BACKGROUND

1. Technical Field

The disclosure relates to a vehicle that includes at least two engagement mechanisms, and is able to set two or more traveling modes by selectively engaging the engagement mechanisms, and also relates to a method of controlling the vehicle.

2. Description of Related Art

A power split mechanism described in Japanese Unexamined Patent Application Publication No. 2017-007437 (JP 2017-007437 A) principally consists of a single pinion type first planetary gear mechanism having a carrier to which an engine is coupled, and a sun gear to which a first motor is coupled, a single pinion type second planetary gear mechanism having a carrier to which a ring gear of the first planetary gear mechanism is coupled, and a ring gear to which drive wheels are coupled, a first clutch mechanism that selectively couples the carrier of the first planetary gear mechanism with a sun gear of the second planetary gear mechanism, and a second clutch mechanism that selectively couples the carrier and ring gear of the second planetary gear mechanism. When the second clutch mechanism is engaged, the power split mechanism is placed in a low mode in which the proportion of power transmitted to the output side is relatively large. When the first clutch mechanism is engaged, the power split mechanism is placed in a high mode in which the above proportion is smaller than that of the low mode. When the first clutch mechanism and the second clutch mechanism are engaged, the power split mechanism is placed in a direct-coupling mode in which torque of the engine is transmitted as it is toward the drive wheels.

SUMMARY

The power split mechanism described in JP 2017-007437 A can set three traveling modes, i.e., low mode, high mode, and direct-coupling mode, by switching the first clutch mechanism between an engaged state and a released state, and switching the second clutch mechanism between an engaged state and a released state. When the low mode is set, the carrier of the first planetary gear mechanism and the sun gear of the second planetary gear mechanism rotate relative to each other; therefore, switching from the low mode to the high mode is normally performed via the direct-coupling mode. Similarly, when the high mode is set, the carrier and ring gear of the second planetary gear mechanism rotate relative to each other; therefore, switching from the high mode to the low mode is normally performed via the direct-coupling mode.

However, if the direct-coupling mode is set when the vehicle is traveling at an extremely low vehicle speed, the engine speed may be reduced to be lower than a rotational speed at which the engine can rotate by itself, and the engine may be stopped. Also, when the direct-coupling mode is set, all of the rotating elements of the power split mechanism rotate at the same rotational speed, and therefore, the accelerator operation of the driver and the engine speed may not conform with each other. More specifically, when the engine speed needs to be increased so as to set the direct-coupling mode, in the process of switching from the low mode to the high mode by reducing the accelerator operation amount, the engine speed is increased, against the driver's presumption that the engine speed would be reduced due to reduction of the amount of accelerator operation by the driver. As a result, the driver may feel strange or uncomfortable. Namely, there is still some room for technical improvement, for appropriately performing switching from the low mode to the high mode, and switching from the high mode to the low mode.

One aspect of the disclosure is to establish a low mode and a high mode, without going through a direct-coupling mode.

A first aspect of the disclosure is concerned with a vehicle. The vehicle includes an engine, drive wheels, a first rotating machine, a transmission mechanism, and an electronic control unit. The transmission mechanism includes a plurality of rotating elements, a first engagement mechanism, and a second engagement mechanism. The plurality of rotating elements include a first rotating element coupled to the engine, a second rotating element coupled to the first rotating machine, and a third rotating element coupled to the drive wheels such that the third rotating element is able to transmit torque to the drive wheels. The first engagement mechanism is configured to selectively couple two rotating elements of the plurality of rotating elements, and the second engagement mechanism is configured to selectively couple two rotating elements of the plurality of rotating elements. The electronic control unit is configured to control the engine, the first rotating machine, the first engagement mechanism, and the second engagement mechanism. The electronic control unit is configured to set a low mode by controlling the first engagement mechanism to an engaged state, and controlling the second engagement mechanism to a released state. The low mode is a mode in which a torque proportion is equal to a first predetermined value. The torque proportion is a proportion of torque transmitted to the third rotating element to torque output from the engine. The electronic control unit is configured to set a high mode by controlling the second engagement mechanism to an engaged state, and controlling the first engagement mechanism to a released state. The high mode is a mode in which the torque proportion is equal to a second predetermined value that is smaller than the first predetermined value. The electronic control unit is configured to set a direct-coupling mode by controlling the first engagement mechanism and the second engagement mechanism to the engaged state. The direct-coupling mode is a mode in which differential operation of the rotating elements is restricted. The electronic control unit is configured to perform first switching control when there is a request for switching from the low mode to the high mode. The first switching control includes i) releasing the first engagement mechanism, ii) controlling the engine to a first predetermined rotational speed, iii) controlling a rotational speed of the first rotating machine such that a difference between an input rotational speed and an output rotational speed of the second engagement mechanism becomes equal to or smaller than a first permissible value, and iv) switching the second engagement mechanism to the engaged state, when the difference between the input rotational speed and the output rotational speed of the second engagement mechanism is equal to or smaller than the first permissible value. The electronic control unit is configured to perform second switching control when there is a request for switching from the high mode to the low mode. The second switching control includes v) releasing the second engagement mechanism, vi) controlling the engine to a second predetermined rotational speed, vii) controlling the rotational speed of the first rotating machine such that a difference between an input rotational speed and an output rotational speed of the first engagement mechanism becomes equal to or smaller than a second permissible value, and viii) switching the first engagement mechanism to the engaged state, when the difference between the input rotational speed and the output rotational speed of the first engagement mechanism is equal to or smaller than the second permissible value.

With the above configuration, when the traveling mode is switched between the low mode and the high mode, one of the first engagement mechanism and the second engagement mechanism, which is currently engaged, is released. Accordingly, the engine, first rotating machine, and drive wheels can be individually rotated. Namely, the engine speed can be controlled as needed. Therefore, the engine speed is less likely or unlikely to be excessively reduced, and can be changed in accordance with the required driving force. As a result, the driver is less likely or unlikely to feel strange or uncomfortable during switching of the traveling mode. Also, the rotational speed of the first rotating machine is controlled during switching of the traveling mode, so as to reduce a difference between the input rotational speed and output rotational speed of the engagement mechanism to be engaged. Since the engagement mechanism can be engaged in this condition, shock that would occur upon engagement of the engagement mechanism can be reduced or eliminated.

In the vehicle as described above, the electronic control unit may be configured to perform switching between the low mode and the high mode without going through the direct-coupling mode, when a vehicle speed of is equal to or lower than a first predetermined vehicle speed.

In the vehicle as described above, the first predetermined vehicle speed may include a vehicle speed at which the engine is unable to rotate by itself when the direct-coupling mode is set.

In the vehicle as described above, the first predetermined vehicle speed may include a vehicle speed at which a rotational speed of the engine becomes equal to or higher than a natural frequency of the transmission mechanism when the direct-coupling mode is set.

In the vehicle as described above, the first predetermined rotational speed and the second predetermined rotational speed of the engine may include an idle speed.

In the vehicle as described above, the electronic control unit may be configured to perform switching between the low mode and the high mode without going through the direct-coupling mode, when the vehicle speed is equal to or higher than a second predetermined vehicle speed.

In the vehicle as described above, the second predetermined vehicle speed may include a vehicle speed at which the rotational speed of the engine is required to vary according to a required driving force required of the vehicle by a driver, when the driver changes the required driving force.

In the vehicle as described above, the first predetermined rotational speed and the second predetermined rotational speed of the engine may change according to the required amount of the driving force.

In the vehicle as described above, the required driving force may include an operation amount of an accelerator adapted to be operated by the driver, and required power that is required of the vehicle.

In the vehicle as described above, the electronic control unit may be configured to perform switching between the low mode and the high mode without going through the direct-coupling mode, when required driving force is equal to or smaller than a predetermined driving force.

The vehicle may further include a second rotating machine coupled to the drive wheels such that the second rotating machine is able to transmit torque to the drive wheels. The predetermined driving force may be equal to or smaller than driving force that is satisfied when a maximum torque is output from the second rotating machine.

The vehicle may further include a power storage device configured to supply electric power to the second rotating machine. The maximum torque able to be output from the second rotating machine may be determined based on permissible operating conditions including a temperature condition of the power storage device and a temperature condition of the second rotating machine.

In the vehicle as described above, the electronic control unit may be configured to perform switching between the low mode and the high mode without going through the direct-coupling mode, when the low mode is restricted from being set.

A second aspect of the disclosure is concerned with a method of controlling a vehicle. The vehicle includes an engine, drive wheels, a first rotating machine, a transmission mechanism including a plurality of rotating elements, and an electronic control unit. The plurality of rotating elements includes a first rotating element coupled to the engine, a second rotating element coupled to the first rotating machine, and a third rotating element coupled to the drive wheels such that the third rotating element is able to transmit torque to the drive wheels. The transmission mechanism includes a first engagement mechanism configured to selectively couple two rotating elements of the plurality of rotating elements, and a second engagement mechanism configured to selectively couple two rotating elements of the plurality of rotating elements. The electronic control unit is configured to control the engine, the first rotating machine, the first engagement mechanism, and the second engagement mechanism. The electronic control unit is configured to set a low mode by controlling the first engagement mechanism to an engaged state, and controlling the second engagement mechanism to a released state. The low mode is a mode in which a torque proportion is equal to a first predetermined value. The torque proportion is a proportion of torque transmitted to the third rotating element to torque delivered from the engine. The electronic control unit is configured to set a high mode by controlling the second engagement mechanism to an engaged state, and controlling the first engagement mechanism to a released state. The high mode is a mode in which the torque proportion is equal to a second predetermined value that is smaller than the first predetermined value. The electronic control unit is configured to set a direct-coupling mode by controlling each of the first engagement mechanism and the second engagement mechanism to the engaged state. The direct-coupling mode is a mode in which differential operation of the rotating elements is restricted. The control method includes a) performing first switching control by the electronic control unit when there is a request for switching from the low mode to the high mode, b) performing second switching control by the electronic control unit when there is request for switching from the high mode to the low mode. The first switching control includes i) releasing the first engagement mechanism, ii) controlling the engine to a first predetermined rotational speed, iii) controlling a rotational speed of the first rotating machine such that a difference between an input rotational speed and an output rotational speed of the second engagement mechanism becomes equal to or smaller than a first permissible value, and iv) switching the second engagement mechanism to the engaged state, when the difference between the input rotational speed and the output rotational speed of the second engagement mechanism is equal to or smaller than the first permissible value. The second switching control includes v) releasing the second engagement mechanism, vi) controlling the engine to a second predetermined rotational speed, vii) controlling the rotational speed of the first rotating machine such that a difference between an input rotational speed and an output rotational speed of the first engagement mechanism becomes equal to or smaller than a second permissible value, and viii) switching the first engagement mechanism to the engaged state, when the difference between the input rotational speed and the output rotational speed of the first engagement mechanism is equal to or smaller than the second permissible value.

With the above configuration, when the traveling mode is switched between the low mode and the high mode, one of the first engagement mechanism and the second engagement mechanism, which is currently engaged, is released. Accordingly, the engine, first rotating machine, and drive wheels can be individually rotated. Namely, the engine speed can be controlled as needed. Therefore, the engine speed is less likely or unlikely to be excessively reduced, and can be changed in accordance with the required driving force. As a result, the driver is less likely or unlikely to feel strange or uncomfortable during switching of the traveling mode. Also, the rotational speed of the first rotating machine is controlled during switching of the traveling mode, so as to reduce a difference between the input rotational speed and output rotational speed of the engagement mechanism to be engaged. Since the engagement mechanism can be engaged in this condition, shock that would occur upon engagement of the engagement mechanism can be reduced or eliminated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table showing engaged and released states of clutch mechanisms and brake mechanism, operating states of motors, and ON/OFF of driving of an engine, in each traveling mode;

DETAILED DESCRIPTION OF EMBODIMENTS

Figure 1:
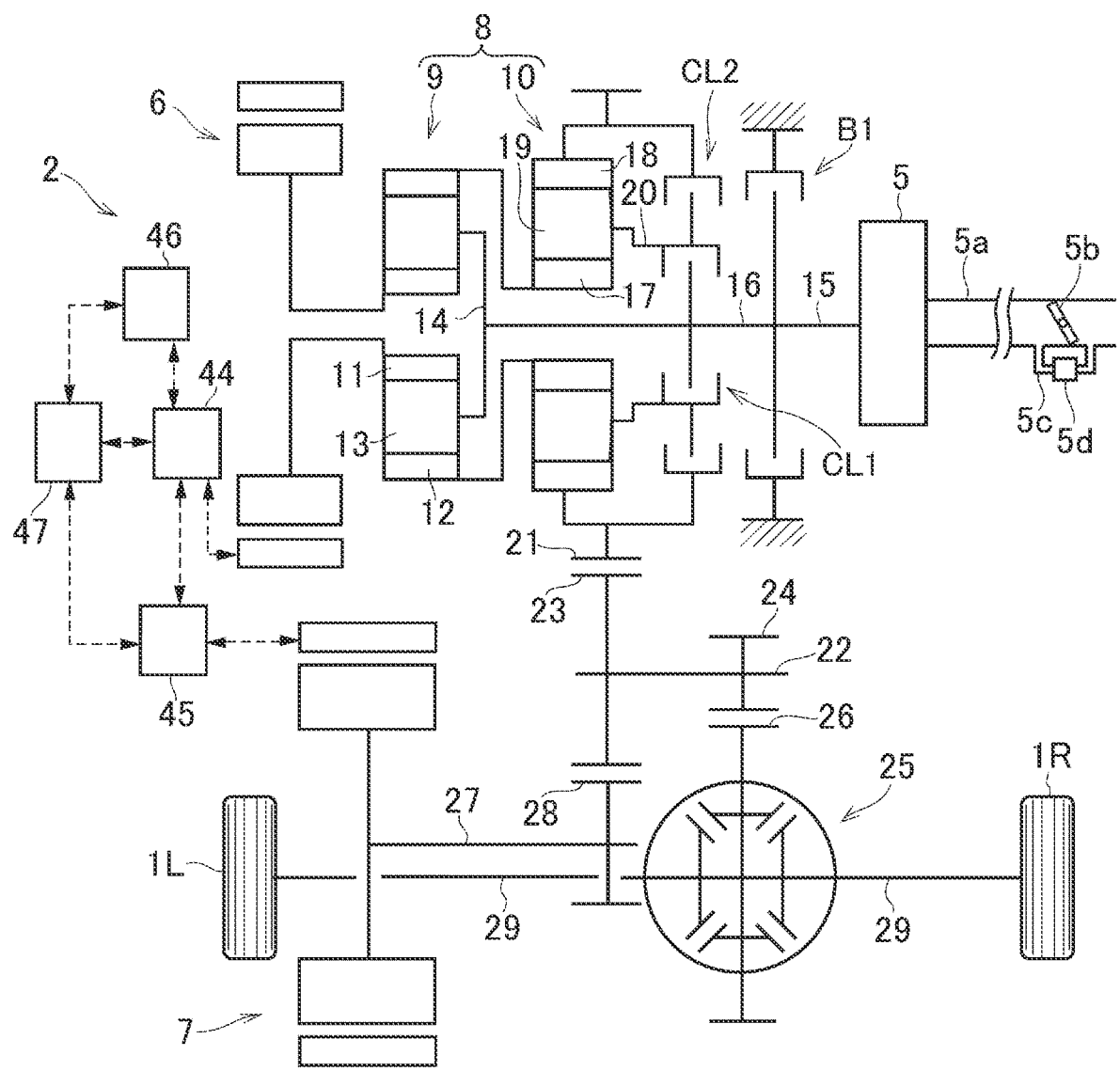
FIG. 1 is a skeleton diagram illustrating one example of a first drive unit.
Figure 2:
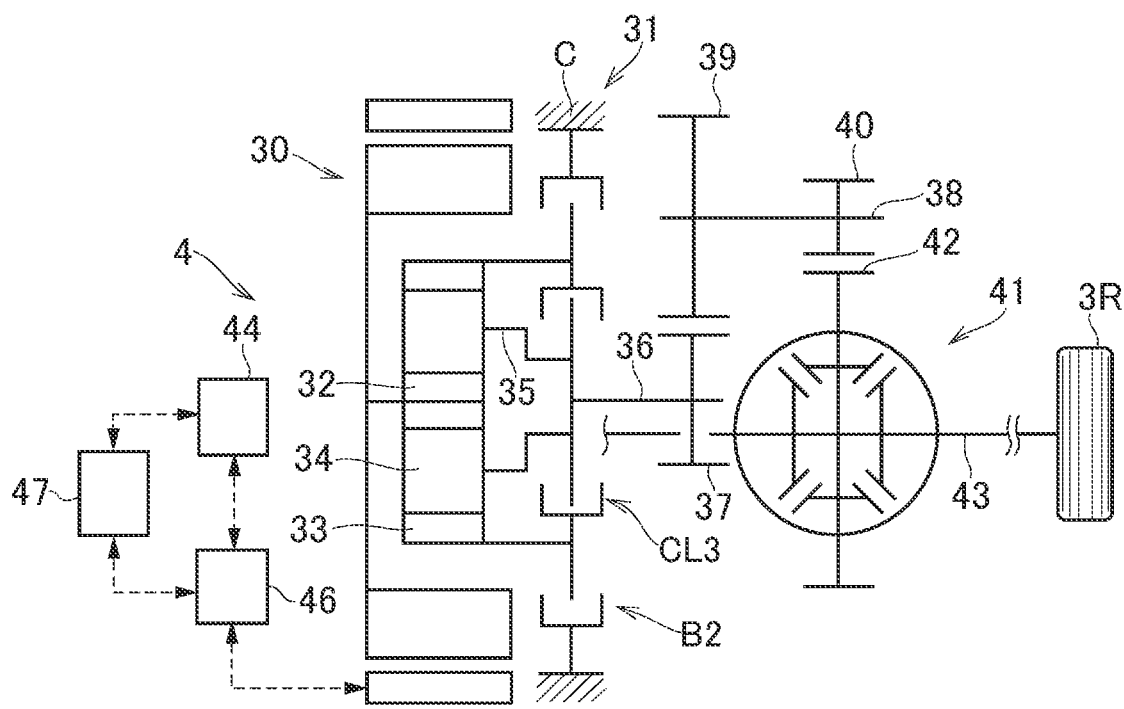
FIG. 2 is a skeleton diagram illustrating one example of a second drive unit.

Referring to FIG. 1 and FIG. 2, one example of a vehicle according to one embodiment of the disclosure will be described. FIG. 1 shows a first drive unit 2 for driving front wheels 1R, 1L, and FIG. 2 shows a second drive unit 4 for driving rear wheels 3R, 3L. The first drive unit 2 is a so-called two-motor type drive unit including an engine 5 and two motors 6, 7 as drive power sources. A first motor 6 is provided by a motor (so-called motor-generator: MG1) having a function of generating electric power. The first drive unit 2 is configured such that the rotational speed of the engine 5 is controlled by the first motor 6, and a second motor 7 is driven with electric power generated by the first motor 6, while driving force delivered by the second motor 7 can be added to driving force for propelling the vehicle. The second motor 7 is provided by a motor (so-called motor-generator: MG2) having a function of generating electric power. The first motor 6 is one example of "first rotating machine" in this embodiment of the disclosure, and the second motor 7 is one example of "second rotating machine" in this embodiment of the disclosure.

The engine 5 can be constructed like conventional engines, and includes an intake pipe 5a through which outside air flows from the outside toward cylinders (not shown) of the engine 5, and an electronic throttle valve 5b that controls the flow rate of the outside air flowing through the intake pipe 5a. A bypass passage 5c that bypasses the electronic throttle valve 5b is formed in the intake pipe 5a, and an idle speed control (ISC) valve 5d that controls the flow rate of the outside air flowing through the bypass passage 5c is provided in the bypass passage 5c. The opening of the electronic throttle valve 5b is controlled according to the driving force required by the driver, and the opening of the ISC valve 5d is controlled according to the idle speed. The idle speed is determined based on a required warm-up amount of the engine 5, for example.

To the engine 5 is connected a power split mechanism 8 as one example of "transmission mechanism" in this embodiment of the disclosure. The power split mechanism 8 consists of a power splitting unit 9 that mainly functions to split torque delivered from the engine 5 to the first motor 6 side and the output side, and a speed changing unit 10 that mainly functions to change the splitting ratio of the torque.

The power splitting unit 9 is only required to be configured to perform differential operation by use of three rotating elements, and may employ a planetary gear mechanism. In the example shown in FIG. 1, the power splitting unit 9 is in the form of a single-pinion type planetary gear mechanism. The power splitting unit 9 shown in FIG. 1 consists principally of a sun gear 11, a ring gear 12 as an internally toothed gear disposed concentrically with the sun gear 11, pinion gears 13 that are disposed between the sun gear 11 and the ring gear 12 and mesh with the sun gear 11 and the ring gear 12, and a carrier 14 that holds the pinion gears 13 such that the pinion gears 13 can rotate about themselves and about the axis of the power splitting unit 9. The sun gear 11 mainly functions as a reaction force element, and the ring gear 12 mainly functions as an output element, while the carrier 14 mainly functions as an input element. The carrier 14 is one example of "first rotating element" in this embodiment of the disclosure, and the sun gear 11 is one example of "second rotating element" in this embodiment of the disclosure.

The carrier 14 is configured to receive power delivered by the engine 5. More specifically, an input shaft 16 of the power split mechanism 8 is coupled to an output shaft 15 of the engine 5, and the input shaft 16 is coupled to the carrier 14. Instead of the arrangement in which the carrier 14 and the input shaft 16 are directly coupled to each other, the carrier 14 and the input shaft 16 may be coupled via a transmission mechanism, such as a gear mechanism. Also, a damper mechanism or a torque converter may be disposed between the output shaft 15 and the input shaft 16.

The first motor 6 is coupled to the sun gear 11. In the example shown in FIG. 1, the power splitting unit 9 and the first motor 6 are disposed on the same axis as the rotation center axis of the engine 5, and the first motor 6 is located on one side of the power splitting unit 9 opposite to the engine 5. Between the power splitting unit 9 and the engine 5, the speed changing unit 10 is disposed on the same axis as the power splitting unit 9 and the engine 5, such that the power splitting unit 9, speed changing unit 10, and engine 5 are arranged in the direction of this axis.

The speed changing unit 10 is in the form of a single-pinion type planetary gear mechanism, and has a sun gear 17, a ring gear 18 as an internally toothed gear disposed concentrically with the sun gear 17, pinion gears 19 that are disposed between the sun gear 17 and the ring gear 18 and mesh with the sun gear 17 and the ring gear 18, and a carrier 20 that holds the pinion gears 19 such that the pinion gears 19 can rotate about themselves and about the axis of the speed changing unit 10. The speed changing unit 10 is a differential mechanism that performs differential operation by use of three rotating elements, i.e., the sun gear 17, ring gear 18, and carrier 20. The ring gear 12 of the power splitting unit 9 is coupled to the sun gear 17 of the speed changing unit 10. An output gear 21 is coupled to the ring gear 18 of the speed changing unit 10. The ring gear 18 is one example of "third rotating element" in this embodiment of the disclosure.

A first clutch mechanism CL1 is provided such that the power splitting unit 9 and the speed changing unit 10 constitute a composite planetary gear mechanism. The first clutch mechanism CL1 is configured to selectively couple the carrier 20 of the speed changing unit 10, to the carrier 14 of the power splitting unit 9. The first clutch mechanism CL1 may be a friction type clutch mechanism, such as a wet multiple disc clutch, or a mesh type clutch mechanism, such as a dog clutch. When the first clutch mechanism CL1 is engaged, the composite planetary gear mechanism is formed in which the carrier 14 of the power splitting unit 9 and the carrier 20 of the speed changing unit 10 are coupled to each other, to provide an input element, and the sun gear 11 of the power splitting unit 9 provides a reaction force element, while the ring gear 18 of the speed changing unit 10 provides an output element. Thus, the rotating elements 11, 12, 14 that constitute the power splitting unit 9 and the rotating elements 17, 18, 20 that constitute the speed changing unit 10 are one example of "a plurality of rotating elements" in this embodiment of the disclosure.

Further, a second clutch mechanism CL2 is provided for integrating the speed changing unit 10 as a whole. The second clutch mechanism CL2 serves to couple at least two rotating elements, for example, couple the carrier 20 and the ring gear 18 or sun gear 17, or the sun gear 17 and the ring gear 18, in the speed changing unit 10, and may be provided by a friction type or mesh type clutch mechanism. In the example shown in FIG. 1, the second clutch mechanism CL2 is configured to couple the carrier 20 with the ring gear 18 in the speed changing unit 10. The first clutch mechanism CL1 and the second clutch mechanism CL2 are disposed on the same axis as the engine 5, power splitting unit 9 and speed changing unit 10, and is located on one side of the speed changing unit 10 opposite to the power splitting unit 9. The clutch mechanisms CL1, CL2 may be arranged on the radially inner side and the radially outer side in radial directions, as shown in FIG. 1, or may be arranged side by side in the axial direction. When the clutch mechanisms CL1, CL2 are arranged in the radial directions as shown in FIG. 1, the axial length of the first drive unit 2 as a whole can be reduced. When the clutch mechanisms CL1, CL2 are arranged in the axial direction, restrictions on the outer diameters of the clutch mechanisms CL1, CL2 are reduced. Thus, when a friction type clutch mechanism is employed, the number of friction plates used in the clutch mechanism can be reduced.

A counter shaft 22 is disposed in parallel with the rotation center axis of the engine 5, power splitting unit 9, or speed changing unit 10. A driven gear 23 that meshes with the output gear 21 is mounted on the counter shaft 22. A drive gear 24 is also mounted on the counter shaft 22, and the drive gear 24 meshes with a ring gear 26 of a differential gear unit 25 as a final reduction gear. Further, a drive gear 28 mounted on a rotor shaft 27 of the second motor 7 meshes with the driven gear 23. Accordingly, power or torque produced by the second motor 7 is added to power or torque delivered from the output gear 21, at the driven gear 23. The power or torque thus combined is delivered from the differential gear unit 25 to right and left drive shafts 29, so that the power or torque is transmitted to the front wheels 1R, 1L.

The first drive unit 2 is further provided with a first brake mechanism B1 of a friction type or mesh type. The first brake mechanism B1 is configured to selectively fix the output shaft 15 or the input shaft 16, so that drive torque delivered from the first motor 6 can be transmitted to the front wheels 1R, 1L. Namely, when the output shaft 15 or the input shaft 16 is fixed by the first brake mechanism B1, the carrier 14 of the power splitting unit 9 or the carrier 20 of the speed changing unit 10 functions as a reaction force element, and the sun gear 11 of the power splitting unit 9 functions as an input element. The first brake mechanism B1 is only required to generate reaction torque when the first motor 6 delivers drive torque, and is not limited to the configuration to fully fix the output shaft 15 or the input shaft 16, but may apply required reaction torque to the output shaft 15 or the input shaft 16. Alternatively, a one-way clutch that inhibits the output shaft 15 or the input shaft 16 from rotating in a direction opposite to the direction of rotation of the engine 5 when it is driven may be provided, in place of the first brake mechanism B1.

The second drive unit 4 is configured to transmit power or torque of a rear motor 30 to the rear wheels 3R, 3L. In FIG. 2, the left rear wheel 3L is not illustrated, for the sake of convenience. The rear motor 30 is provided by a motor (i.e., motor-generator: MGR) having a function of generating electric power, like the first motor 6 and the second motor 7. A speed change mechanism 31 coupled to the rear motor 30 is configured to be selectively switched between a speed reduction gear position for amplifying torque of the rear motor 30, and a fixed gear position for permitting torque of the rear motor 30 to be delivered as it is without being changed.

The speed change mechanism 31 shown in FIG. 2 is in the form of a single-pinion type planetary gear mechanism having a sun gear 32, a ring gear 33 as an internally toothed gear disposed concentrically with the sun gear 32, pinion gears 34 that are disposed between the sun gear 32 and the ring gear 33 and mesh with the sun gear 32 and the ring gear 33, and a carrier 35 that holds the pinion gears 34 such that the pinion gears 34 can rotate about themselves and about the axis of the speed change mechanism 31.

The sun gear 32 of the speed change mechanism 31 is coupled to the rear motor 30, and functions as an input element. The carrier 35 is coupled to the output shaft 36, and functions as an output element. A third clutch mechanism CL3 is provided for placing the speed change mechanism 31 in the fixed gear position. The third clutch mechanism CL3 is adapted to couple at least two rotating elements, for example, couple the sun gear 32 and the ring gear 33 or carrier 35, or the ring gear 33 and the carrier 35, in the speed change mechanism 31, and may be provided by a friction type or mesh type clutch mechanism. In the example shown in FIG. 2, the third clutch mechanism CL3 is configured to couple the ring gear 33 with the carrier 35 in the speed change mechanism 31.

Further, a second brake mechanism B2 is provided for placing the speed change mechanism 31 in the speed reduction gear position. The second brake mechanism B2 may be in the form of a friction type or mesh type engagement mechanism, which is configured to selectively fix the ring gear 33 of the speed change mechanism 31. The second brake mechanism B2 shown in FIG. 2 engages the ring gear 33 with a case C in which the second drive unit 4 is housed, so as to fix the ring gear 33. Thus, the ring gear 33 functions as a reaction force element when it is fixed by the second brake mechanism B2. Like the first brake mechanism B1, the second brake mechanism B2 is not limited to the one that completely fix the ring gear 33.

A drive gear 37 is mounted on the output shaft 36 of the speed change mechanism 31. A counter shaft 38 is disposed in parallel with the output shaft 36, and a driven gear 39 that meshes with the drive gear 37 is mounted on one end portion of the counter shaft 38. The driven gear 39 is formed with a larger diameter than that of the drive gear 37, and is thus configured to amplify the output torque of the speed change mechanism 31. A drive gear 40 is mounted on the other end portion of the counter shaft 38, and the drive gear 40 meshes with a ring gear 42 of a differential gear unit 41 as a final reduction gear. A drive shaft 43 is coupled to the differential gear unit 41, and power delivered from the rear motor 30 is transmitted to the rear wheels 3R, 3L, via the drive shaft 43.

A first power control unit 44 including an inverter and a converter is coupled to the first motor 6, and a second power control unit 45 including an inverter and a converter is coupled to the second motor 7, while a third power control unit 46 including an inverter and a converter is coupled to the rear motor 30. These power control units 44, 45, 46 are coupled to a power storage device 47 in the form of a lithium-ion battery or a capacitor. The first power control unit 44, second power control unit 45 and third power control unit 46 are also configured to be able to supply electric power to each other. More specifically, when the first motor 6 generates reaction force torque, to thus function as a generator, electric power generated by the first motor 6 can be supplied to the second motor 7 and the rear motor 30, without going through the power storage device 47.

Figure 3:
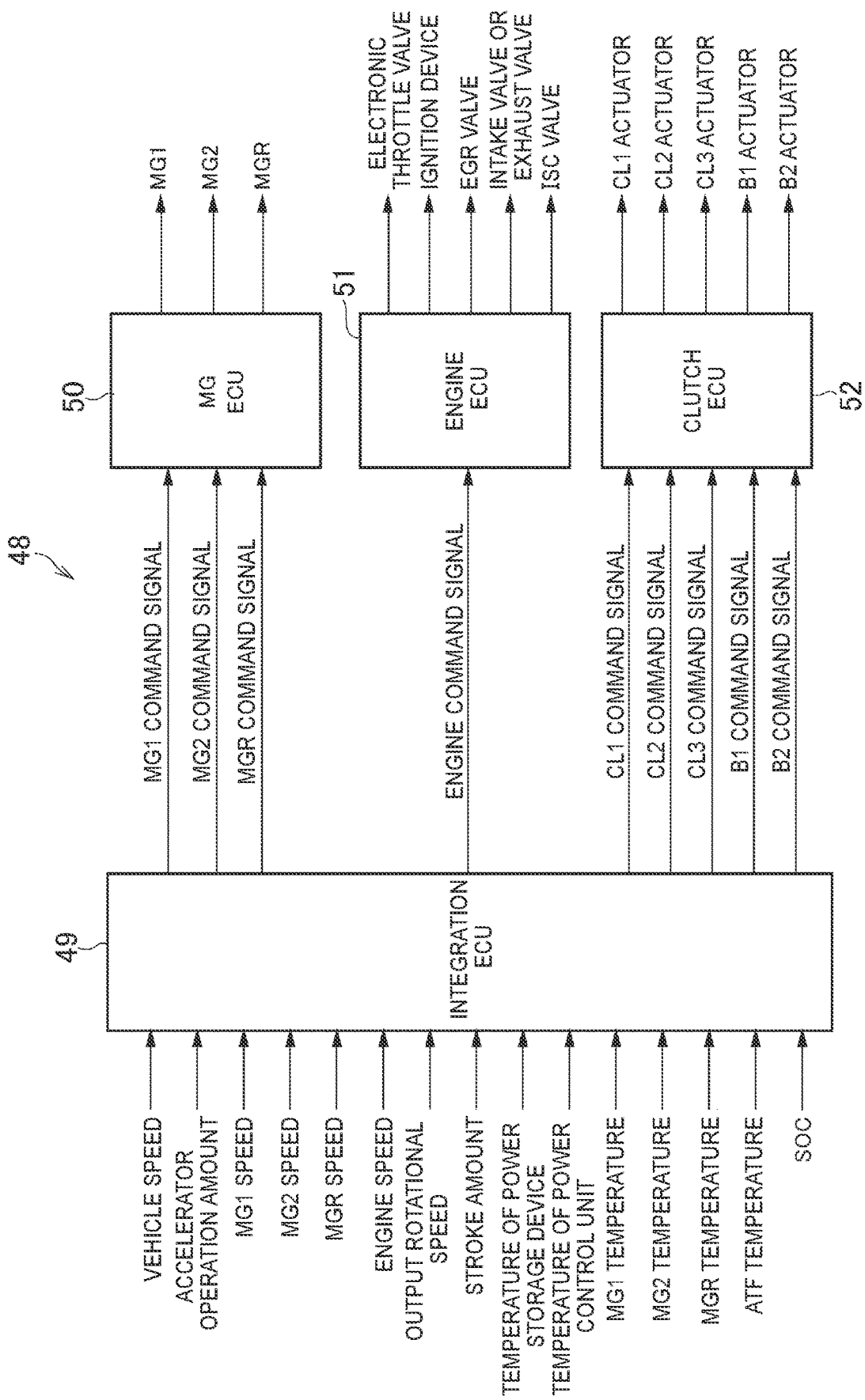
FIG. 3 is a block diagram illustrating the configuration of an electronic control unit (ECU)

An electronic control unit (ECU) 48 is provided for controlling the inverters and converters of the power control units 44, 45, 46, engine 5, clutch mechanisms CL1, CL2, CL3, and brake mechanisms B1, B2. The ECU 48 is one example of "electronic control unit" in this embodiment of the disclosure, and consists mainly of a microcomputer. FIG. 3 is a block diagram illustrating one example of the configuration of the ECU 48. In the example shown in FIG. 3, the ECU 48 consists of an integration ECU 49, MG-ECU 50, engine ECU 51, and clutch ECU 52.

The integration ECU 49 receives data from various sensors installed on the vehicle, and outputs command signals to the MG-ECU 50, engine ECU 51, and clutch ECU 52, based on the received data, and maps, arithmetic expressions, etc. stored in advance. One example of data received by the integration ECU 49 is shown in FIG. 3. In this example, the integration ECU 49 receives data, including the vehicle speed, accelerator operation amount, rotational speed of the first motor (MG1) 6, rotational speed of the second motor (MG2) 7, rotational speed of the rear motor (MGR) 30, rotational speed (engine speed) of the output shaft 15 of the engine 5, output rotational speed as the rotational speed of the ring gear 18 of the speed changing unit 10 or the counter shaft 22, the stroke amount of a piston provided in each of the clutch mechanisms CL1, CL2, CL3 and the brake mechanisms B1, B2, temperature of the power storage device 47, temperatures of the power control units 44, 45, 46, temperature of the first motor 6, temperature of the second motor 7, temperature of the rear motor 30, temperature of oil (ATF) that lubricates the power splitting unit 9 and the speed changing unit 10 or the speed change mechanism 31, and the remaining charge amount (SOC) of the power storage device 47, for example.

The integration ECU 49 obtains operating conditions (output torque and rotational speed) of the first motor 6, operating conditions (output torque and rotational speed) of the second motor 7, and operating conditions (output torque and rotational speed) of the rear motor 30, based on the received data, and outputs the obtained data as command signals to the MG-ECU 50. Similarly, the integration ECU 49 obtains operating conditions (output torque and rotational speed) of the engine 5 based on the received data, and outputs the obtained data as command signals to the engine ECU 51. Further, the integration ECU 49 obtains the transmission torque capacity (including "0") of each of the clutch mechanisms CL1, CL2, CL3 and the brake mechanisms B1, B2, based on the received data, and outputs the obtained data as command signals to the clutch ECU 52.

The MG-ECU 50 obtains current values representing current that should be passed through the respective motors 6, 7, 30, based on the data received from the integration ECU 49, and outputs command signals to the motors 6, 7, 30. Since each motor 6, 7, 30 is an alternating-current (AC) motor, the command signal includes the frequency of electric current that should be produced in the inverter, and a voltage value to which the voltage should be raised by the converter.

The engine ECU 51 obtains current for fixing the opening of the electronic throttle valve 5*b*, current for igniting fuel in ignition devices, current for fixing the opening of an exhaust gas recirculation (EGR) valve, current value for fixing the openings of intake valves and exhaust valves, current for fixing the opening of the ISC valve 5*d*, and so forth, based on the data received from the integration ECU 49, and outputs command signals to the respective valves and devices. Namely, the engine ECU 51 outputs command signals for controlling the output (power) of the engine 5, output torque of the engine 5, or the engine speed.

The clutch ECU 52 obtains a current value representing current to be passed through an actuator, which determines the engaging pressure of each of the clutch mechanisms CL1, CL2, CL3 and brake mechanisms B1, B2, based on the data received from the integration ECU 49, and outputs a command signal to the actuator of each mechanism.

The first drive unit 2 can be placed in one of an HV traveling mode in which drive torque is delivered from the engine 5, and an EV traveling mode in which the vehicle travels with drive torque delivered from the first motor 6 and the second motor 7. Further, a selected one of an HV-Lo mode, HV-Hi mode, and direct-coupling mode is set as the HV traveling mode. In the HV-Lo mode, the rotational speed of the engine 5 (or the input shaft 16) is higher than the rotational speed of the ring gear 18 of the speed changing unit 10, when the first motor 6 is rotated at a low speed (including rotation at zero speed). In the HV-Hi mode, the rotational speed of the engine 5 (or the input shaft 16) is lower than the rotational speed of the ring gear 18 of the speed changing unit 10. In the direct-coupling mode, the rotational speed of the ring gear 18 of the speed changing unit 10 is equal to the rotational speed of the engine 5 (or the input shaft 16), namely, differential operation of the rotating elements that constitute the power split mechanism 8 is restricted. The HV-Lo mode is one example of "low mode" in this embodiment of the disclosure, and the HV-Hi mode is one example of "high mode" in this embodiment of the disclosure.

Also, as the EV traveling mode, it is possible to selectively set a dual mode in which drive torque is delivered from the first motor 6 and the second motor 7, and a single mode in which drive torque is delivered solely from the second motor 7 while no drive torque is delivered from the first motor 6. Further, as the dual mode, it is possible to selectively set an EV-Lo mode having a relatively large amplification factor of torque delivered from the first motor 6, and an EV-Hi mode having a relatively small amplification factor of torque delivered from the first motor 6. In the single mode, the vehicle can travel with drive torque delivered solely from the second motor 7, in a condition where the first clutch mechanism CL1 is engaged, or the vehicle can travel with drive torque delivered solely from the second motor 7, in a condition where the second clutch mechanism CL2 is engaged, or the vehicle can travel with drive torque delivered solely from the second motor 7, in a condition where each clutch mechanism CL1, CL2 is released.

Each of the traveling modes is established by controlling the first clutch mechanism CL1, second clutch mechanism CL2, first brake mechanism B1, engine 5, and the motors 6, 7. FIG. 4 shows a table indicating one example of these traveling modes, and engaged and released states of the first clutch mechanism CL1, second clutch mechanism CL2, and first brake mechanism B1, operating states of the first motor 6 and the second motor 7, and the presence or absence of output of drive torque from the engine 5, in each traveling mode. In the columns of CL1, CL2 and CL3 in FIG. 4, a black circle indicates an engaged state, and a minus sign indicates a released state. In the columns of MG1 and MG2 in FIG. 4, "G" means that the motor-generator in question operates mainly as a generator, and "M" means that the motor-generator operates mainly as a motor, while a blank means a condition where the motor-generator does not function as a motor nor as a generator, or the first motor 6 and the second motor 7 are not involved in driving. In the column of the engine "ENG" in FIG. 4, "ON" indicates a condition where drive torque is delivered from the engine 5, and "OFF" indicates a condition where drive torque is not delivered from the engine 5.

FIG. 5 through FIG. 10 show nomographic charts showing the rotational speeds of the respective rotating elements of the power split mechanism 8, and the direction of torque of each of the engine 5 and motors 6, 7, where each traveling mode is established. In the nomographic chart, straight lines indicating the respective rotating elements of the power split mechanism 8 are drawn in parallel with each other with intervals representing the gear ratios, and the distance from a base line that intersects at right angles with these straight lines represents the rotational speed of each rotating element. On the straight line indicating each rotating element, the direction of torque is indicated by an arrow, and the magnitude of the torque is indicated by the length of the arrow.

Figure 5:
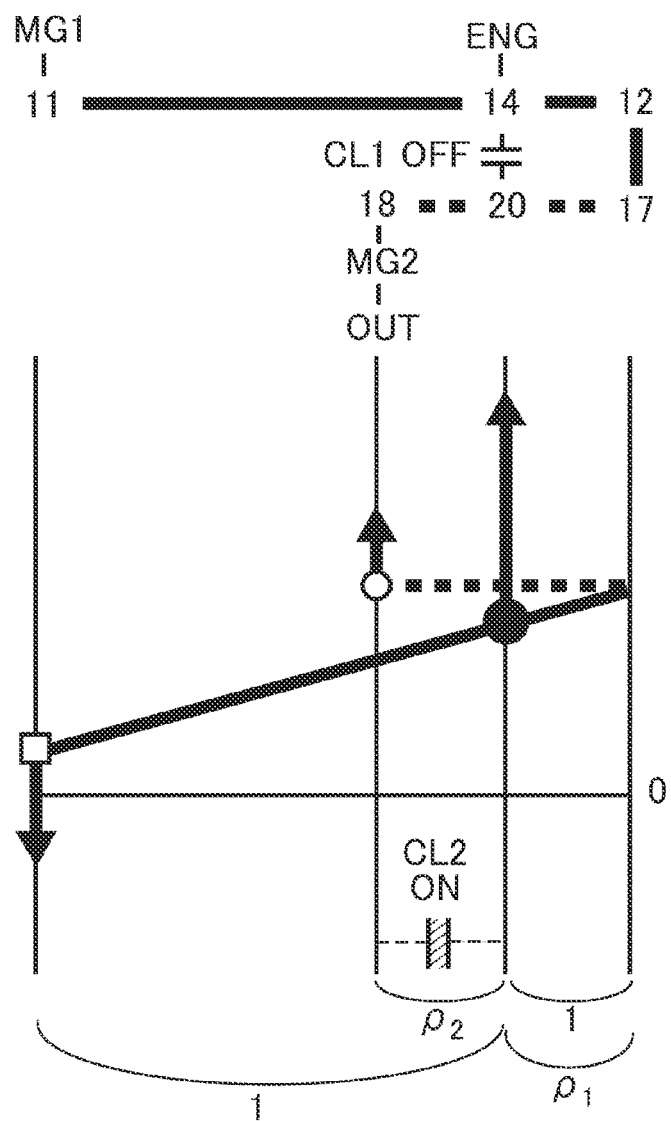
FIG. 5 is a nomographic chart illustrating operating conditions in an HV-Hi mode.
Figure 6:
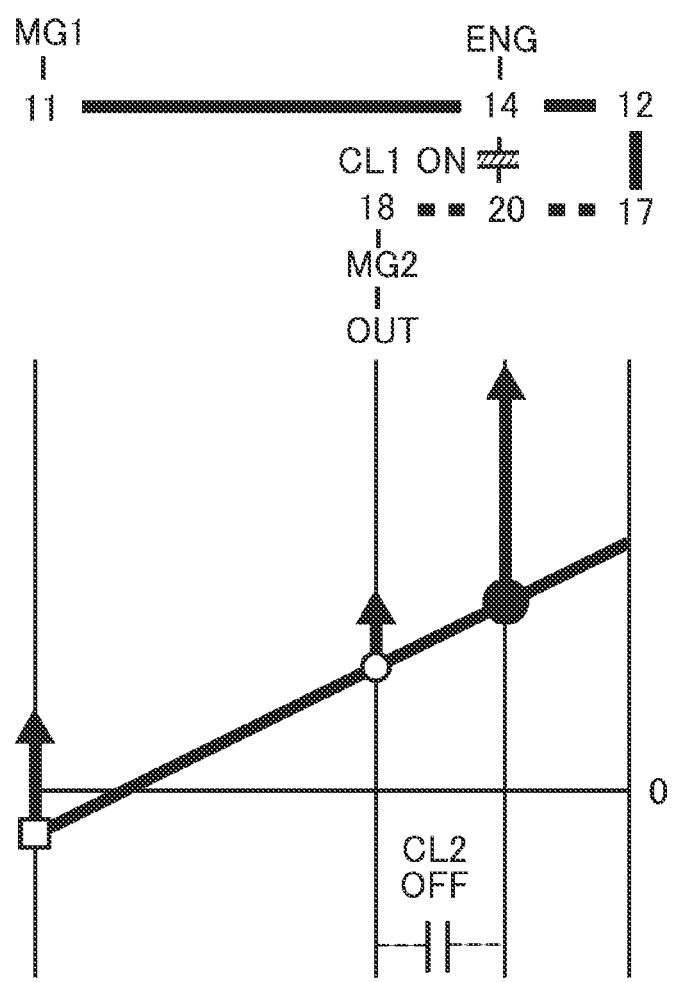
FIG. 6 is a nomographic chart illustrating operating conditions in an HV-Lo mode.

As shown in FIG. 5 and FIG. 6, in the HV-Hi mode and the HV-Lo mode, drive torque is delivered from the engine 5, and either one of the first clutch mechanism CL1 and the second clutch mechanism CL2 is engaged, while reaction force torque is delivered from the first motor 6. In this case, the rotational speed of the first motor 6 is controlled so as to optimize the efficiency (obtained by dividing the total amount of consumed energy of fuel and electric power by the energy amount of the front wheels 1R, 1L) of the first drive unit 2 as a whole, in view of the fuel economy of the engine 5 and the drive efficiency of the first motor 6. The rotational speed of the first motor 6 can be continuously changed, and the engine speed is determined based on the rotational speed of the first motor 6 and the vehicle speed. Accordingly, the power split mechanism 8 can function as a continuously variable transmission.

When the first motor 6 delivers reaction force torque, and thus functions as a generator, as described above, a part of the power of the engine 5 is converted by the first motor 6 into electric energy. Then, power obtained by subtracting the amount of power converted by the first motor 6 into electric energy, from the power of the engine 5, is transmitted to the ring gear 18 of the speed changing unit 10. The reaction force torque delivered from the first motor 6 is determined according to the splitting ratio of torque transmitted from the engine 5 toward the first motor 6 via the power split mechanism 8. The ratio of the torque transmitted from the engine 5 to the first motor 6 side via the power split mechanism 8, to the torque transmitted to the ring gear 18 side, namely, the torque splitting ratio of the power split mechanism 8, is different between the HV-Lo mode and the HV-Hi mode.

More specifically, where the torque transmitted to the first motor 6 side is regarded as "1", the torque splitting ratio as the proportion of torque transmitted to the ring gear 18 side in the HV-Lo mode is expressed as "$1/(\rho1 \times \rho2)$", and the torque splitting ratio in the HV-Hi mode is expressed as "$1/\rho1$". Namely, the proportion of torque transmitted to the ring gear 18, to torque delivered from the engine 5, is expressed as "$1/(1-(\rho1 \times \rho2))$" in the HV-Lo mode, and is expressed as "$1/(\rho1+1)$" in the HV-Hi mode. Here, "$\rho1$" is the gear ratio (the ratio of the number of teeth of the ring gear 12 to the number of teeth of the sun gear 11) of the power splitting unit 9, and "$\rho2$" is the gear ratio (the ratio of the number of teeth of the ring gear 18 to the number of teeth of the sun gear 17) of the speed changing unit 10. In this connection, $\rho1$ and $\rho2$ are set to values smaller than "1". Accordingly, when the HV-Lo mode is set, the proportion of torque transmitted to the ring gear 18 is larger than that in the case where the HV-Hi mode is set. The proportion "$1/(1-(\rho1 \times \rho2))$" of torque transmitted to the ring gear 18, to torque delivered from the engine 5, when the HV-Lo mode is set is one example of "first predetermined value" in this embodiment of the disclosure, and the proportion "$1/(\rho1+1)$" of torque transmitted to the ring gear 18, to torque delivered from the engine 5, when the HV-Hi mode is set is one example of "second predetermined value" in this embodiment of the disclosure. When the rotational speed of the engine 5 is increased by torque generated in the engine 5, torque obtained by subtracting the torque required to increase the rotational speed of the engine 5 from the torque generated in the engine 5 is referred to as "torque delivered from the engine 5". Namely, torque substantially delivered from the output shaft 15 of the engine 5 is referred to as torque delivered from the engine 5.

Then, electric power generated by the first motor 6 is supplied to the second motor 7. In this case, electric power stored in the power storage device 47 is also supplied as needed to the second motor 7. The second motor 7 and the rear motor 30 function to add drive torque to the drive torque transmitted from the engine 5, and the second motor 7 and the rear motor 30 can be regarded as the same one, in terms of control of drive torque in the vehicle as a whole. Thus, electric power may be supplied to the rear motor 30 in place of the second motor 7, or in addition to the second motor 7. In an example described below, the drive torque to be added is delivered solely from the second motor 7.

Figure 7:
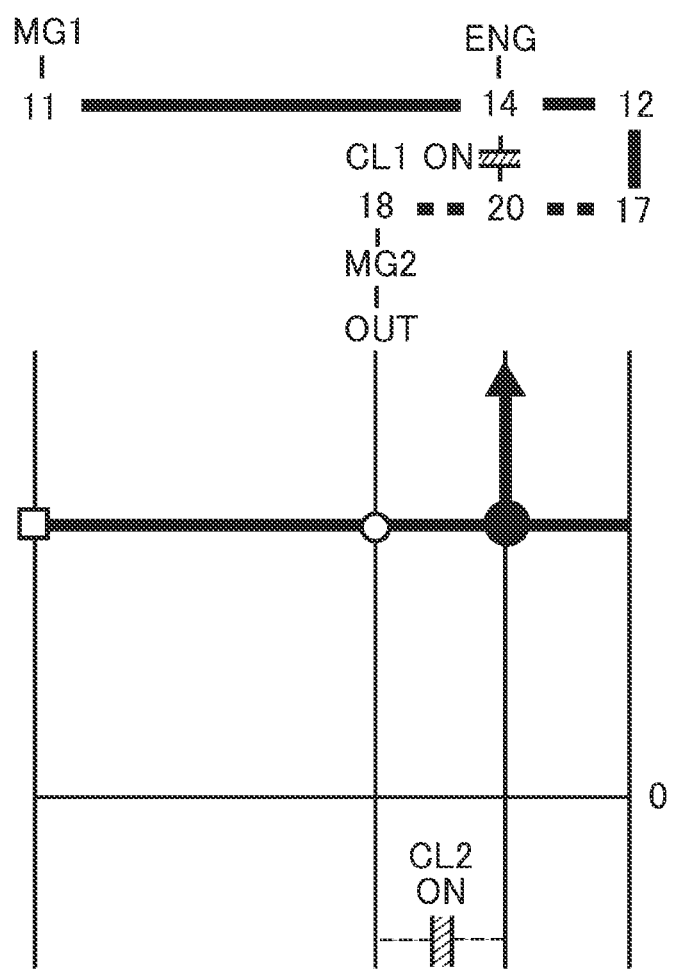
FIG. 7 is a nomographic chart illustrating operating conditions in a direct-coupling mode.

In the direct-coupling mode, the clutch mechanisms CL1, CL2 are engaged, so that the respective rotating elements of the power split mechanism 8 rotate at the same speed, as shown in FIG. 7. Namely, the entire power of the engine 5 is delivered from the power split mechanism 8. In other words, no part of the power of the engine 5 is converted into electric energy by the first motor 6 or the second motor 7. Accordingly, no loss appears due to electric resistance that would be produced during conversion into electric energy, and therefore, the power transmission efficiency can be improved.

Figure 8:
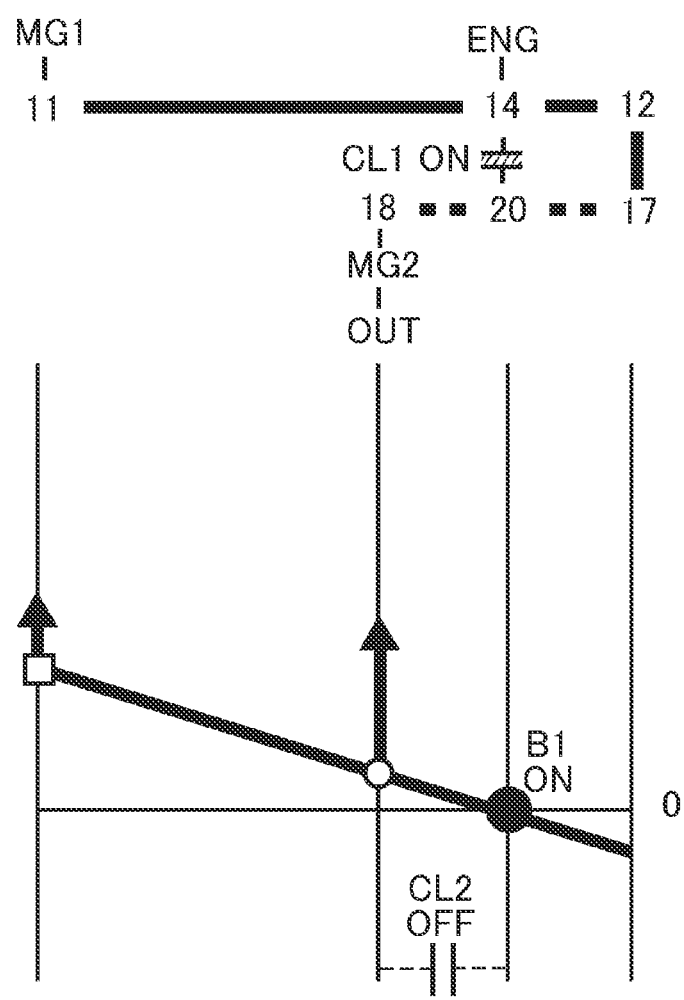
FIG. 8 is a nomographic chart illustrating operating conditions in an EV-Lo mode.
Figure 9:
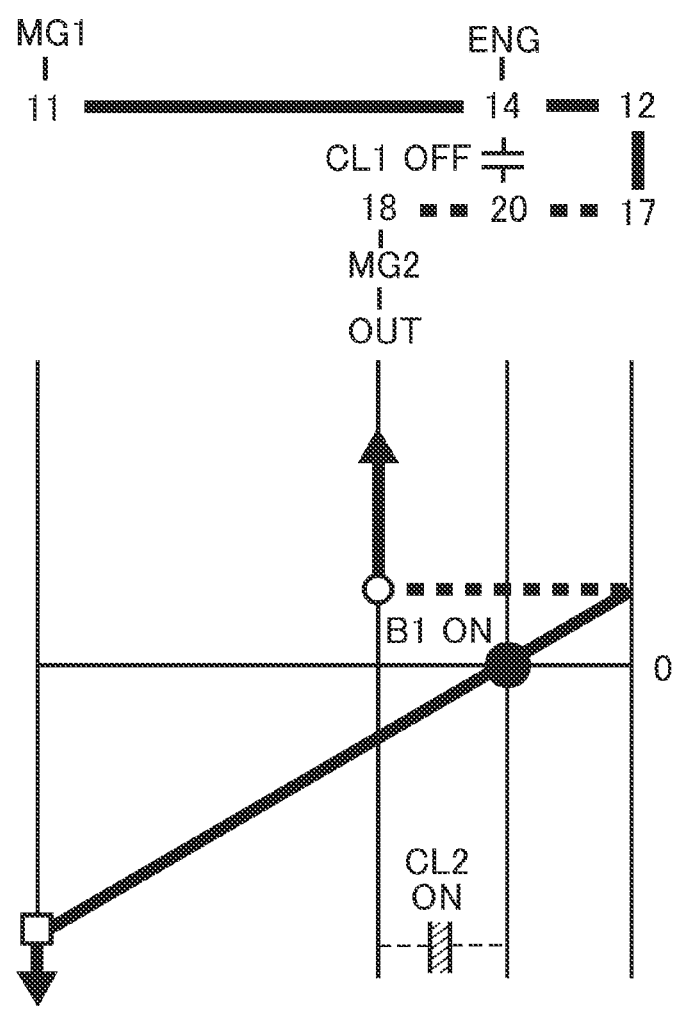
FIG. 9 is a nomographic chart illustrating operating conditions in an EV-Hi mode.
Figure 10:
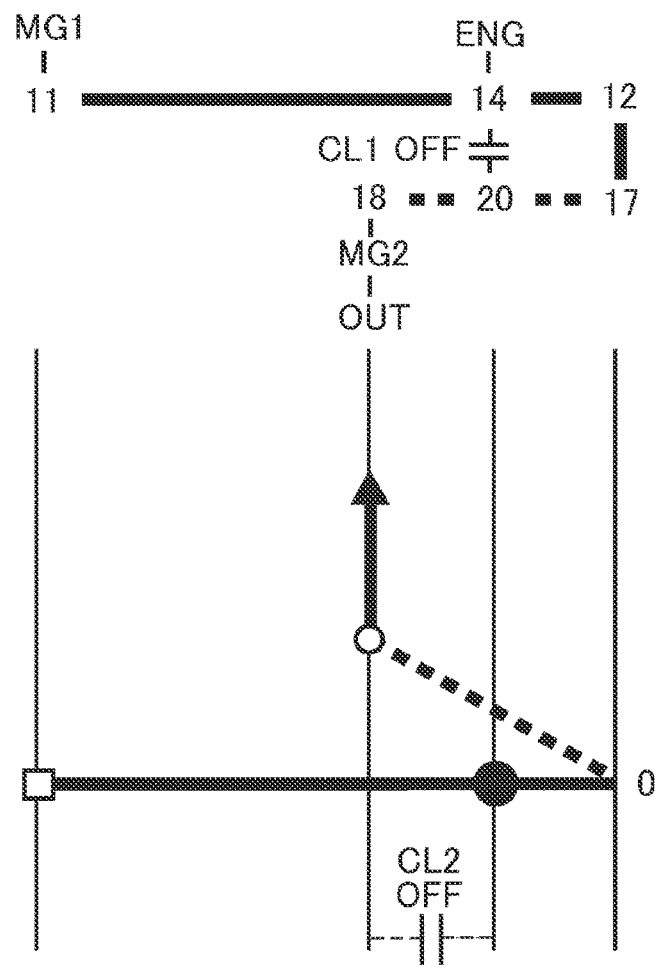
FIG. 10 is a nomographic chart illustrating operating conditions in a single mode.

In the EV-Lo mode and the EV-Hi mode as shown in FIG. 8 and FIG. 9, the first brake mechanism B1 is engaged, and drive torque is delivered from the motors 6, 7, to propel the vehicle. As shown in FIG. 8 and FIG. 9, the ratio of the rotational speed of the ring gear 18 of the speed changing unit 10 to the rotational speed of the first motor 6 is smaller in the EV-Lo mode, than that in the EV-Hi mode. Namely, the speed reduction ratio is larger in the EV-Lo mode, than that in the EV-Hi mode. Therefore, large driving force can be obtained by setting the EV-Lo mode. In the single mode, drive torque is delivered solely from the second motor 7 as shown in FIG. 10, and the clutch mechanisms CL1, CL2 are released, so that the rotating elements of the power split mechanism 8 are stopped. It is thus possible to reduce a power loss, which would arise due to dragging of the engine 5 and the first motor 6.

Each of the above traveling modes is determined based on the remaining charge amount (SOC) of the power storage device 47, vehicle speed, required driving force, and so forth. In this embodiment, a charge sustain (CS) mode in which each traveling mode is set so as to maintain the remaining charge amount of the power storage device 47, or a charge depleting (CD) mode in which electric power stored in the power storage device 47 is positively used is selected according to the remaining charge amount of the power storage device 47. More specifically, the CS mode is selected when the remaining charge amount of the power storage device 47 is reduced, and the CD mode is selected when the remaining charge amount of the power storage device 47 is relatively large.

Figure 11:
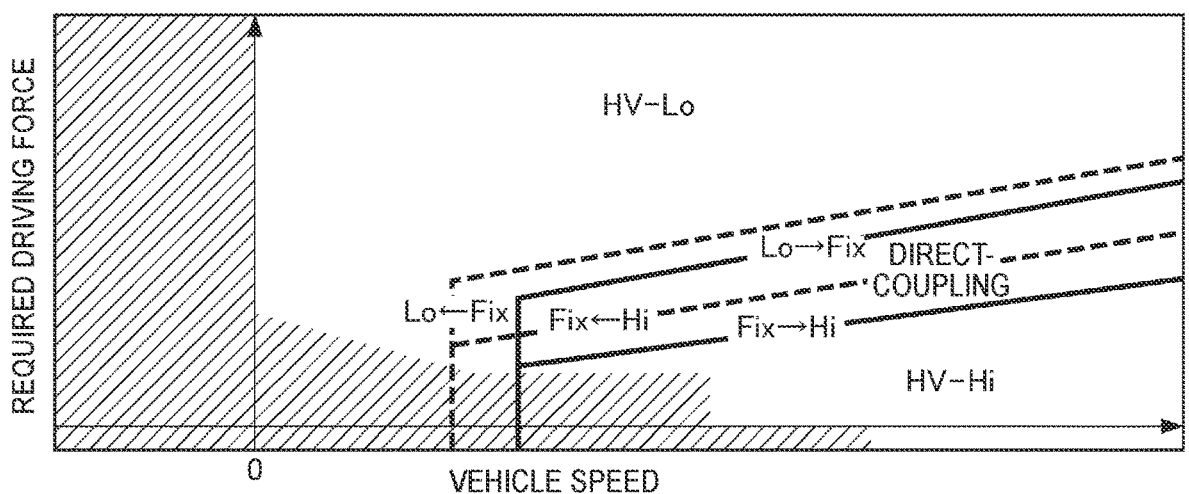
FIG. 11 is a view showing one example of a map for determining each traveling mode when a CS mode is selected.

FIG. 11 shows one example of a map for determining each traveling mode when the CS mode is selected. In this map, the horizontal axis indicates the vehicle speed, and the vertical axis indicates the required driving force. The vehicle speed can be obtained from data detected by the vehicle speed sensor, and the required driving force can be obtained from data detected by the accelerator position sensor.

In the example shown in FIG. 11, when the vehicle travels backward, the single mode is set, irrespective of the magnitude of the required driving force. The single mode is also set when the vehicle travels forward, and the required driving force is relatively small (including the case where the vehicle speed is required to be reduced). A region in which the single mode is set is determined based on characteristics of the second motor 7 and the rear motor 30. In FIG. 11, the region in which the single mode is set is hatched.

When the vehicle travels forward, and the required driving force is relatively large, the HV traveling mode is set. In the HV traveling mode, driving force can be generated from a low-vehicle-speed region to a high-vehicle-speed region. Thus, when the remaining charge amount of the power storage device 47 becomes close to the lower-limit value, for example, the HV traveling mode may be set, even in a region where the single mode should be set.

When the HV traveling mode is set, one of the HV-Lo mode, HV-Hi mode, and direct-coupling mode is selected, according to the vehicle speed and the required driving force. More specifically, the HV-Lo mode is selected when the vehicle speed is relatively low, or the required driving force is relatively large, and the HV-Hi mode is selected when the vehicle speed is relatively high, and the required driving force is relatively small. The direct-coupling mode is selected, when the vehicle is in an operating state corresponding to an operating point (a value based on the vehicle speed and the required driving force) between a region where the HV-Lo mode is set and a region where the HV-Hi mode is set.

Figure 12:
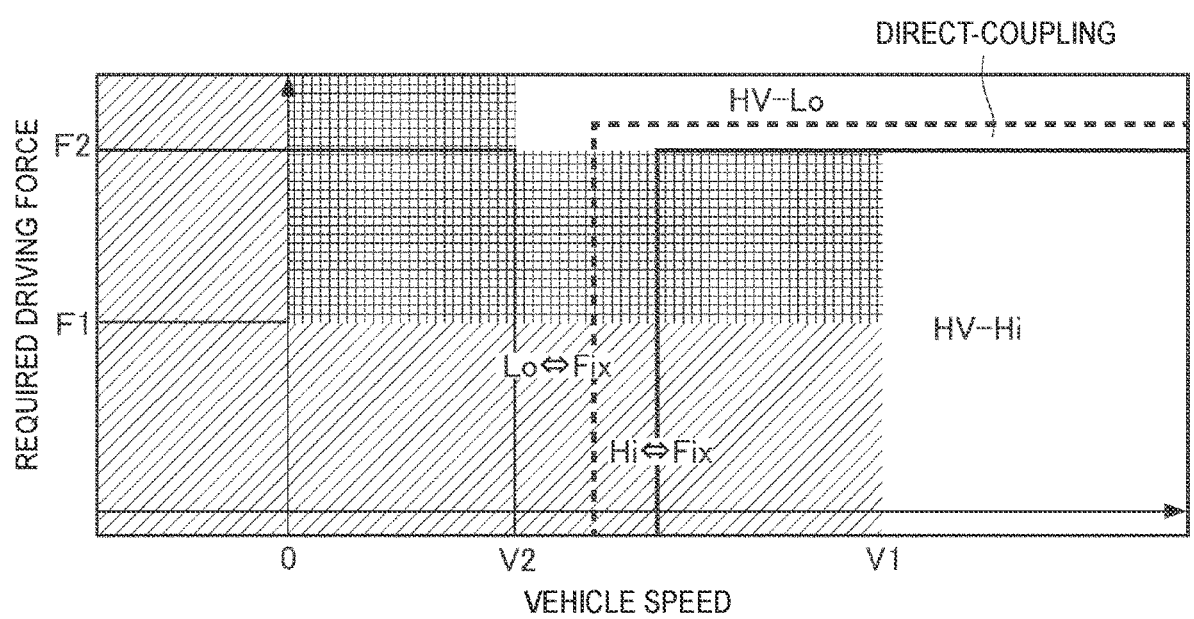
FIG. 12 is a view showing one example of a map for determining each traveling mode when a CD mode is selected.

The first drive unit 2 is configured to be switched among the HV-Lo mode, direct-coupling mode, and HV-Hi mode when the operating point crosses each line shown in FIG. 11. More specifically, the first drive unit 2 is switched from the direct-coupling mode to the HV-Lo mode, when the operating point crosses a line labelled with "LoFix" in FIG. 11 from the right-hand side to the left-hand side, or from the lower side to the upper side. The first drive unit 2 is switched from the HV-Lo mode to the direct-coupling mode, when the operating point crosses a line labelled with "Lo→Fix" from the left-hand side to the right-hand side, or from the upper side to the lower side. Similarly, the first drive unit 2 is switched from the HV-Hi mode to the direct-coupling mode, when the operating point crosses a line labelled with "Fix←Hi" in FIG. 11 from the right-hand side to the left-hand side, or from the lower side to the upper side. The first drive unit 2 is switched from the direct-coupling mode to the HV-Hi mode, when the operating point crosses a line labelled with "Fix→Hi" from the left-hand side to the right-hand side, or from the upper side to the lower side FIG. 12 shows one example of a map for determining each traveling mode when the CD mode is selected. In this map, the horizontal axis indicates the vehicle speed, and the vertical axis indicates the required driving force. The vehicle speed can be obtained from data detected by the vehicle speed sensor, and the required driving force can be obtained from data detected by the accelerator position sensor.

In the example shown in FIG. 12, when the vehicle travels backward, the single mode is set, irrespective of the magnitude of the required driving force. The single mode is also set when the vehicle travels forward, and the required driving force is smaller than a first driving force F1 (including the case where the vehicle speed is required to be reduced). A region in which the single mode is set is determined based on characteristics of the second motor 7 and the rear motor 30. In FIG. 12, the region in which the single mode is set is hatched.

When the vehicle travels forward, and the required driving force is larger than the first driving force F1, the dual mode is set. Further, the HV traveling mode is set when the vehicle speed is higher than a first vehicle speed V1, or when the vehicle speed is higher than a second vehicle speed V2 and the required driving force is larger than a second driving force F2. In the HV traveling mode, driving force can be generated from a low-vehicle-speed region to a high-vehicle-speed region. Thus, when the remaining charge amount of the power storage device 47 becomes close to the lower-limit value, for example, the HV traveling mode may be set, even in a region where the single mode or dual mode should be set.

When the HV traveling mode is set, one of the HV-Lo mode, HV-Hi mode and direct-coupling mode is selected, according to the vehicle speed and the required driving force. More specifically, the HV-Lo mode is selected when the vehicle speed is relatively low, or the required driving force is relatively large, and the HV-Hi mode is selected when the vehicle speed is relatively high, and the required driving force is relatively small. The direct-coupling mode is selected, when the vehicle is in a traveling state corresponding to an operating point (a value based on the vehicle speed and the required driving force) between a region where the HV-Lo mode is set, and a region where the HV-Hi mode is set.

The first drive unit 2 is configured to be switched among the HV-Lo mode, direct-coupling mode, and HV-Hi mode when the operating point crosses each line shown in FIG. 12. More specifically, the first drive unit 2 is switched between the direct-coupling mode and the HV-Lo mode, when the operating point crosses a line labelled with "Lo↔Fix" in FIG. 12. Similarly, the first drive unit 2 is switched between the HV-Hi mode and the direct-coupling mode, when the operating point crosses a line labelled with "Fix↔Hi" in FIG. 12.

The regions in which the traveling modes shown in FIG. 11 and FIG. 12 are set, and the lines used for switching the modes under conditions where the HV traveling mode is set, may be adapted to vary according to the temperature of each member that constitutes the first drive unit 2, temperature(s) of the power storage device 47 or the power control units 44, 45, 46, or the remaining charge amount of the power storage device 47.

In the HV-Hi mode, the first clutch mechanism CL1 is released, so that the carrier 14 of the power splitting unit 9 and the carrier 20 of the speed changing unit 10 can rotate relative to each other, as shown in FIG. 5; therefore, a difference between the input rotational speed (e.g., the rotational speed of the carrier 14 of the power splitting unit 9) and the output rotational speed (e.g., the rotational speed of the carrier 20 of the speed changing unit 10) of the first clutch mechanism CL1 may become large, depending on the vehicle speed and the rotational speed of the engine 5. In this situation, when a request for switching from the HV-Hi mode to the HV-Lo mode is made, the rotational speed of the engine 5 is normally changed by the first motor 6, so as to reduce the difference between the input rotational speed and output rotational speed of the first clutch mechanism CL1, and then, the first clutch mechanism CL1 is engaged. Namely, the direct-coupling mode is temporarily set. Subsequently, the second clutch mechanism CL2 is released.

Similarly, in the HV-Lo mode, the second clutch mechanism CL2 is released, so that the carrier 20 and ring gear 18 of the speed changing unit 10 can rotate relative to each other as shown in FIG. 6; therefore, a difference between the input rotational speed (e.g., the rotational speed of the carrier 20 of the speed changing unit 10) and the output rotational speed (e.g., the rotational speed of the ring gear 18 of the speed changing unit 10) of the second clutch mechanism CL2 may become large, depending on the vehicle speed and the rotational speed of the engine 5. In this situation, when a request for switching from the HV-Lo mode to the HV-Hi mode is made, the rotational speed of the engine 5 is normally changed by the first motor 6, so as to reduce the difference between the input rotational speed and output rotational speed of the second clutch mechanism CL2, and then, the second clutch mechanism CL2 is engaged. Namely, the direct-coupling mode is temporarily set. Subsequently, the first clutch mechanism CL1 is released.

In the meantime, when switching between the HV-Hi mode and the HV-Lo mode is performed, it may be impossible or undesirable to set the direct-coupling mode, depending on traveling conditions, for example. More specifically, if the direct-coupling mode is set when the vehicle speed is low, the rotational speed of the engine 5 may be reduced down to a rotational speed that leads to engine stall. Accordingly, when the vehicle speed is low, it may be impossible to set the direct-coupling mode while keeping the engine 5 rotating. When the driver reduces the amount of operation of the accelerator pedal, the driver presumes that the rotational speed of the engine 5 will be reduced. To the contrary, when the driver increases the amount of operation of the accelerator pedal, the driver presumes that the rotational speed of the engine 5 will be increased. Thus, if change of the rotational speed of the engine 5 caused by setting the direct-coupling mode is different from change presumed by the driver, or if the engine speed remains unchanged due to temporary setting of the direct-coupling mode, the driver may feel strange or uncomfortable.

Figure 13:
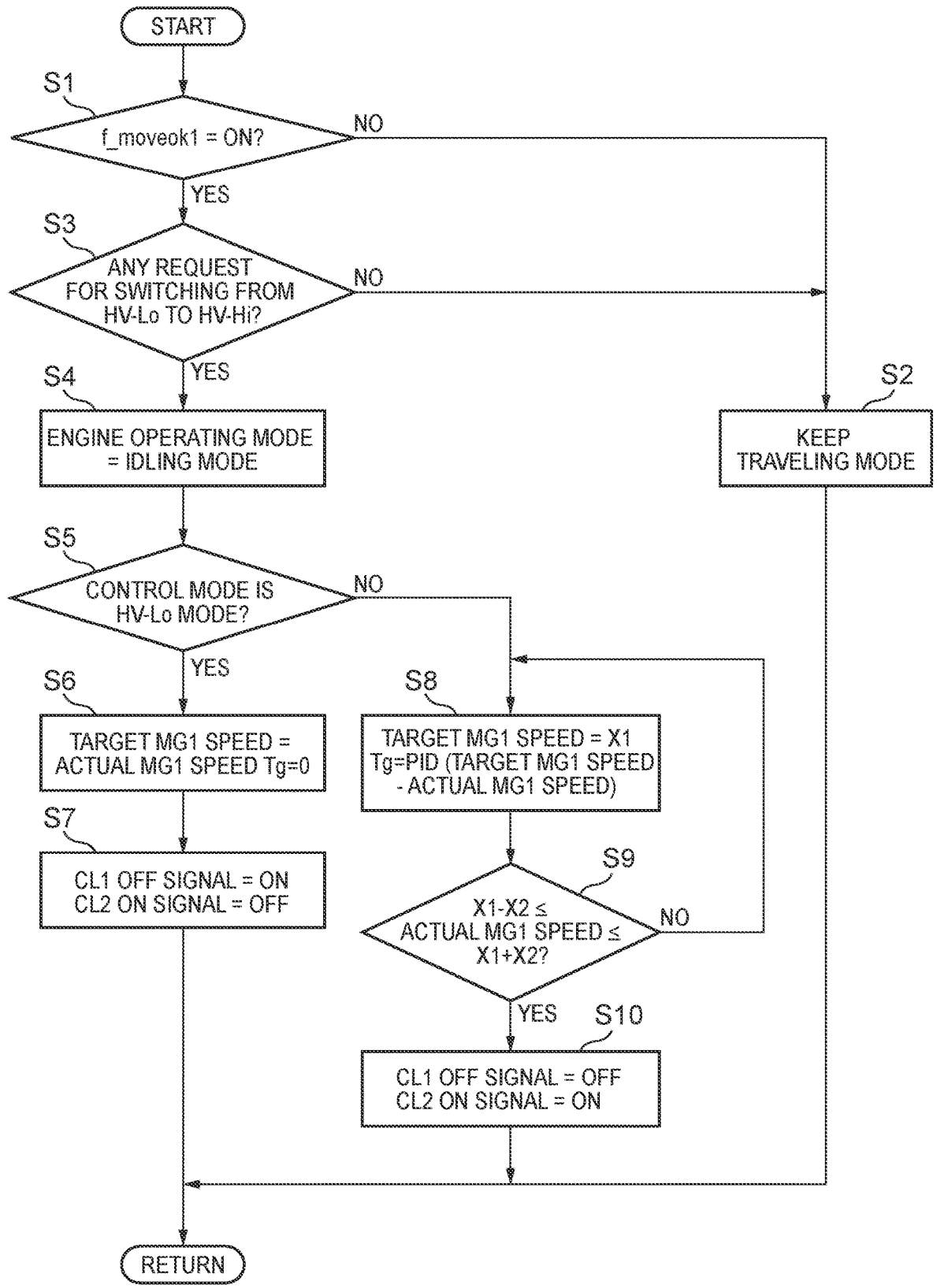
FIG. 13 is a flowchart illustrating an example of control performed when the vehicle is switched between the HV-Lo mode and the HV-Hi mode, without going through the direct-coupling mode, while traveling at a low speed.

Therefore, the first drive unit 2 of the vehicle according to this embodiment of the disclosure is configured to be switched between the HV-Lo mode and the HV-Hi mode, without going through the direct-coupling mode. One example of this control is illustrated in FIG. 13. The control example shown in FIG. 13 is executed by the ECU 48, when a request for switching from the HV-Lo mode to the HV-Hi mode is made while the vehicle is traveling at a low speed.

In the example shown in FIG. 13, initially, it is determined whether a flag f_moveok1 is ON (step S1). The flag f_moveok1 is set to ON when the vehicle speed is such that the engine speed becomes equal to a rotational speed that leads to engine stall when the direct-coupling mode is set, and temporary reduction of the driving force does not occur when switching from the HV-Lo mode to the HV-Hi mode is performed without setting the direct-coupling mode. Namely, the flag f_moveok1 is switched to ON when it is permitted to perform switching from the HV-Lo mode to the HV-Hi mode without setting the direct-coupling mode.

Figure 14:
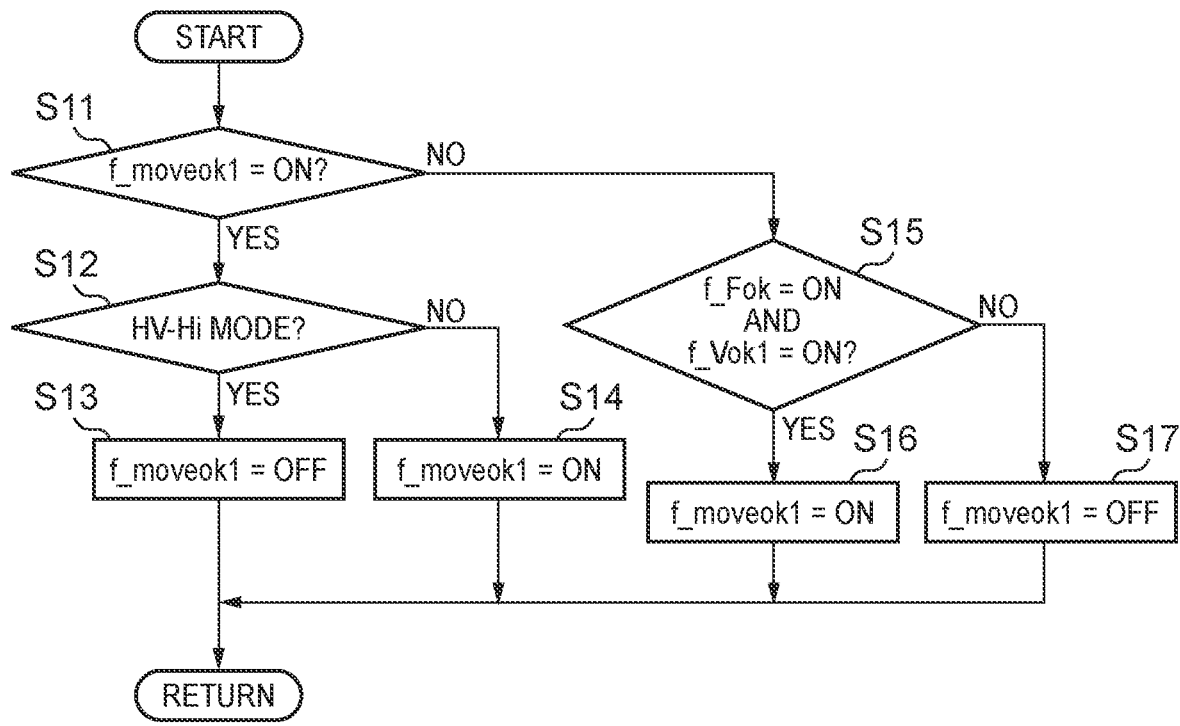
FIG. 14 is a flowchart illustrating a control example for setting a flag f_moveok1.

FIG. 14 shows one example of a flowchart for setting the flag f_moveok1. In the example shown in FIG. 14, initially, it is determined whether the flag f_moveok1 is ON at present (step S11). Namely, it is determined whether the control returned in a condition where the flag f_moveok1 was set to ON, when the last cycle of the flowchart shown in FIG. 14 was executed.

When the flag f_moveok1 is currently ON, and an affirmative decision (YES) is obtained in step S11, it is determined whether the traveling mode that is currently set is the HV-Hi mode (step S12). The determination in step S12 can be made, according to conditions of the clutch mechanisms CL1, CL2, and conditions of the engine 5 and the motors 6, 7.

When the traveling mode currently set is the HV-Hi mode, and an affirmative decision (YES) is obtained in step S12, the flag f_moveok1 is switched to OFF (step S13), and the control returns. To the contrary, when the traveling mode currently set is not the HV-Hi mode, namely, the traveling mode currently set is the HV-Lo mode, or direct-coupling mode, or EV traveling mode, and a negative decision (NO) is obtained in step S12, the flag f_moveok1 is kept ON (step S14), and the control returns.

On the other hand, when the flag f_moveok1 is currently OFF, and a negative decision (NO) is obtained in step S11, it is determined whether a flag f_Fok and a flag f_Vok1 are ON (step S15). The flag f_Fok in step S15 is set to ON when it is possible to perform switching between the HV-Lo mode and the HV-Hi mode while satisfying the required driving force. More specifically, the flag f_Fok is set to ON when the required driving force can be satisfied solely by the drive torque of the second motor 7, in a transition period of switching between the HV-Lo mode and the HV-Hi mode. The flag f_Vok1 in step S15 is set to ON when the vehicle speed is equal to or lower than a speed at which the engine speed becomes equal to a rotational speed that leads to engine stall when the direct-coupling mode is set.

Figure 15:
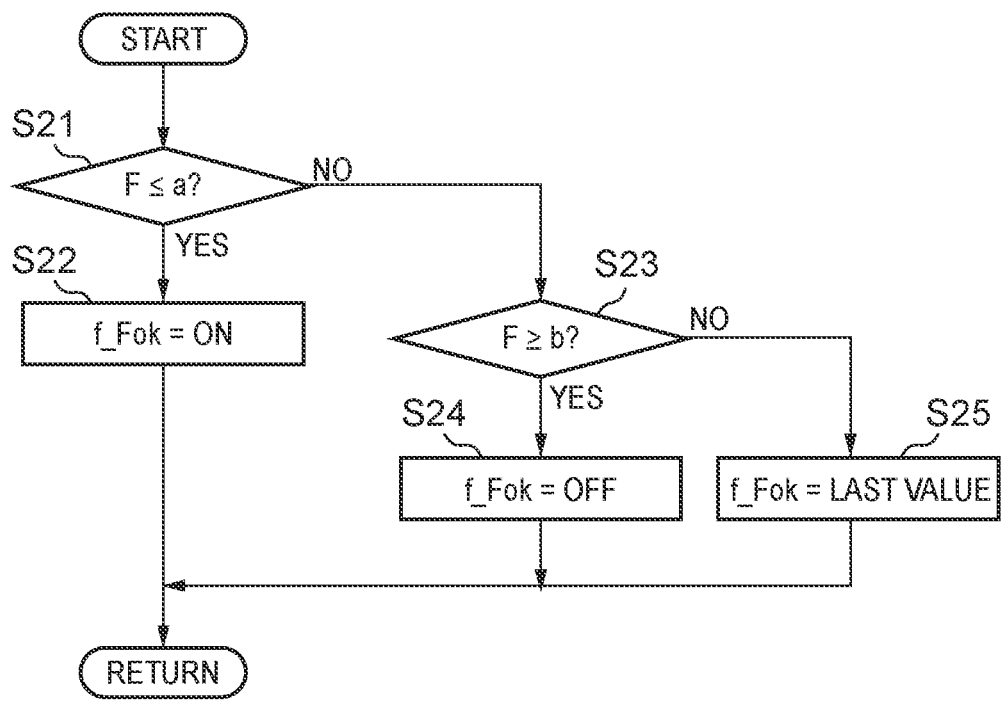
FIG. 15 is a flowchart illustrating a control example for setting a flag f_Fok.

FIG. 15 shows one example of a flowchart for setting the flag f_Fok. In the example shown in FIG. 15, initially, it is determined whether the required driving force F is equal to or smaller than a first driving force "a" (step S21). The first driving force "a" is set to driving force that can be satisfied solely by the drive torque of the second motor 7. On the other hand, the drive torque (maximum torque) that can be delivered from the second motor 7 varies depending on a temperature condition of the second motor 7, a temperature condition of the second power control unit 45, or the SOC and temperature condition of the power storage device 47, for example, as well as the rated torque of the second motor 7. Further, when the first motor 6 functions as a motor in a transition period of switching between the HV-Lo mode and the HV-Hi mode, electric power obtained by subtracting electric power consumed by the first motor 6 from electric power than can be delivered from the power storage device 47 is supplied to the second motor 7, and the drive torque that can be delivered from the second motor 7 is determined according to the electric power thus supplied. The first driving force "a" is one example of "predetermined driving force" in this embodiment of the disclosure.

Figure 16:
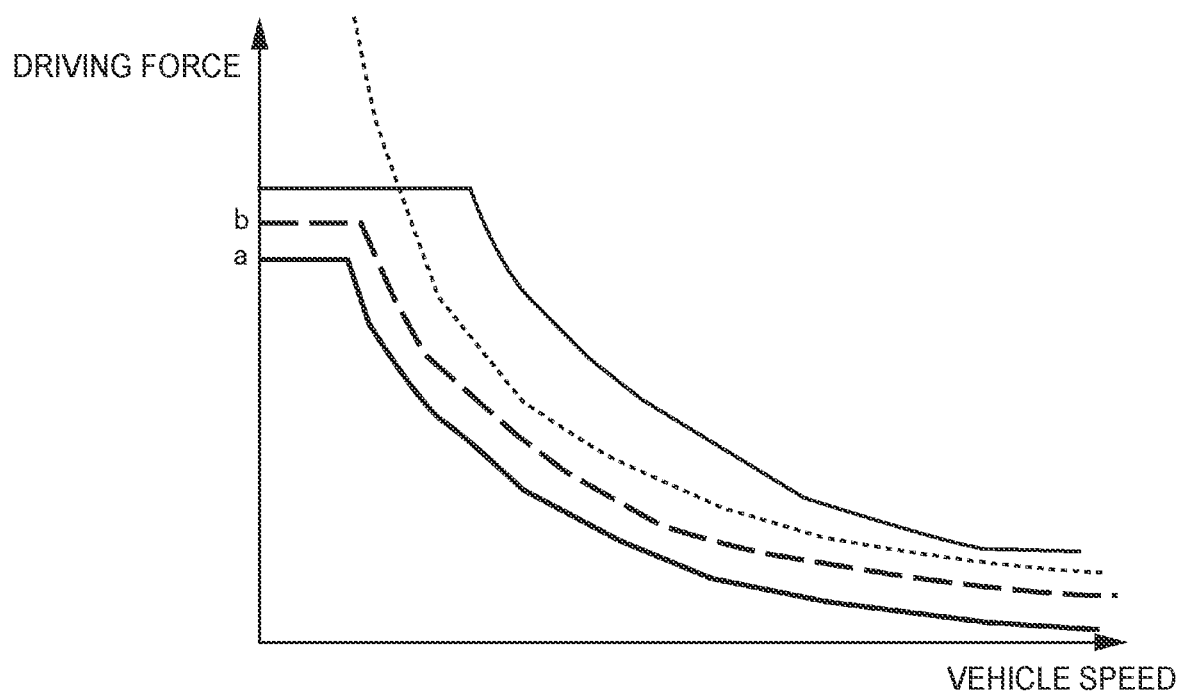
FIG. 16 is a view showing one example of a map for determining first driving force.

FIG. 16 schematically shows a graph for determining the first driving force "a". In FIG. 16, the horizontal axis indicates the vehicle speed, and the vertical axis indicates the driving force. In FIG. 16, a thin solid line indicates values based on the rated torque of the second motor 7. Namely, the thin solid line indicates the driving force in the case where the maximum torque is delivered from the second motor 7. The torque that can be delivered from the second motor 7 is restricted, according to the temperature of coils in the second motor 7, and the temperature of magnets provided in the second motor 7, for example. In this case, the driving force corresponding to the output torque of the second motor 7 varies toward the origin in FIG. 16. On the other hand, electric power than can be supplied to the second motor 7 varies according to temperature conditions of the second power control unit 45 and the power storage device 47, for example. In FIG. 16, a thin broken line indicates driving force corresponding to the torque that can be delivered from the second motor 7 when the electric power supplied to the second motor 7 is restricted. Accordingly, under conditions shown in FIG. 16, the driving force corresponding to the maximum torque that can be delivered from the second motor 7 is within a region defined by the thin broken line. Thus, the first driving force "a" is set to driving force obtained by subtracting a fixed value, from the driving force corresponding to the maximum torque that can be delivered from the second motor 7 according to the current conditions of the second motor 7 and the power storage device 47, for example, as indicated by a thick solid line in FIG. 16.

When the required driving force is equal to or smaller than the first driving force "a", and an affirmative decision (YES) is obtained in step S21, the required driving force can be satisfied solely by the drive torque of the second motor 7, in the transition period of switching between the HV-Lo mode and the HV-Hi mode; therefore, the flag f_Fok is set to ON (step S22), and the control returns. To the contrary, when the required driving force is larger than the first driving force "a", and a negative decision (NO) is obtained in step S21, it is determined whether the required driving force is equal to or larger than a second driving force "b" (step S23). This step S23 is provided for determining whether the flag F_Fok is to be switched to OFF. Accordingly, the second driving force "b" is set to a value that is larger than the first drive force "a" and smaller than the driving force corresponding to the maximum torque that can be delivered from the second motor 7. In FIG. 16, a thick broken line indicates the second driving force "b".

When the required driving force is equal to or larger than the second driving force "b", and an affirmative decision (YES) is obtained in step S23, the flag f_Fok is set to OFF (step S24), and the control returns. To the contrary, when the required driving force is smaller than the second driving force "b", and a negative decision (NO) is obtained in step S23, setting of the flag f_Fok is maintained (step S25), and the control returns. Namely, the flag f_Fok is kept in the OFF state in the case where the flag f_Fok was OFF when the last cycle of this routine was executed, and the flag f_Fok is kept in the ON state in the case where the flag f_Fok was ON when the last cycle of this routine was executed.

Figure 17:
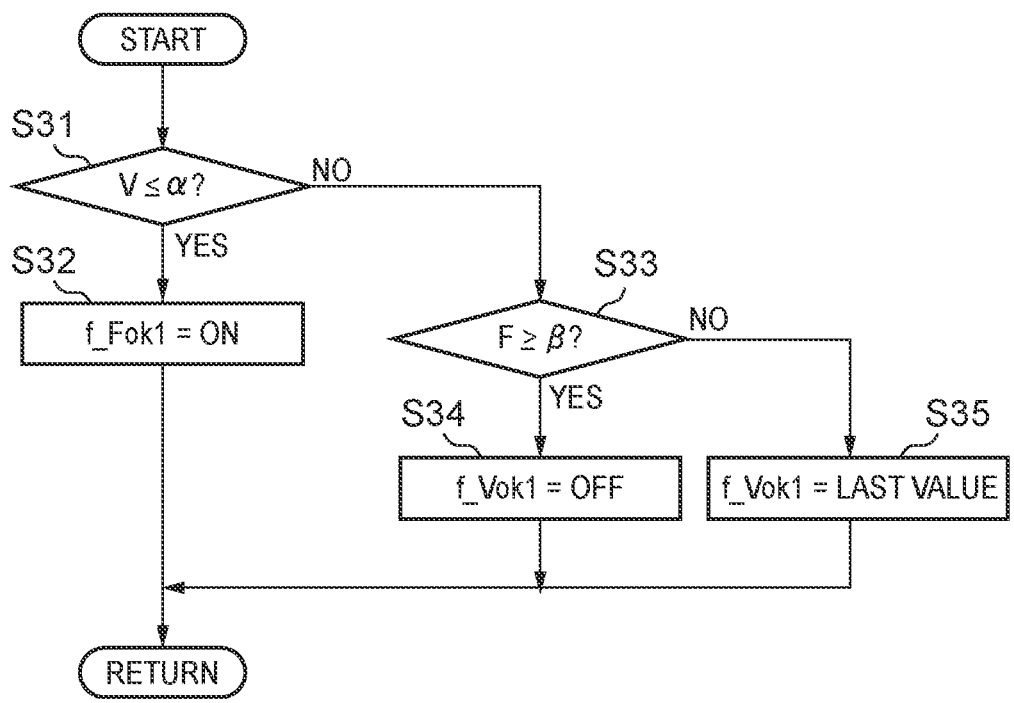
FIG. 17 is a flowchart illustrating a control example for setting a flag f_Vok1.

FIG. 17 shows one example of a flowchart for setting the flag f_Vok1. In the example shown in FIG. 17, initially, it is determined whether the vehicle speed V is equal to or lower than a first vehicle speed "α" (step S31). The first vehicle speed "α" is set to a vehicle speed that is higher, by a given value, than the vehicle speed that leads to engine stall when the direct-coupling mode is set. In another example, the first vehicle speed α is set such that the rotational speed of the engine 5 becomes equal to or higher than the natural frequency of the power split mechanism 8 when the direct-coupling mode is set. The first vehicle speed "α" is one example of "first predetermined vehicle speed" in this embodiment of the disclosure.

When the vehicle speed V is equal to or lower than the first vehicle speed "α", and an affirmative decision (YES) is obtained in step S31, the flag f_Vok1 is set to ON (step S32), and the control returns. To the contrary, when the vehicle speed V is higher than the first vehicle speed "α", and a negative decision (NO) is obtained in step S31, it is determined whether the vehicle speed V is equal to or higher than a second vehicle speed "β" (step S33). This step S33 is provided for determining whether the flag f_Vok1 is switched to OFF. Accordingly, the second vehicle speed "β" is set to a vehicle speed that is higher than the first vehicle speed "α".

When the vehicle speed V is equal to or higher than the second vehicle speed "β", and an affirmative decision (YES) is obtained in step S33, the flag f_Vok1 is set to OFF (step S34), and the control returns. To the contrary, when the vehicle speed V is lower than the second vehicle speed "β", and a negative decision (NO) is obtained in step S33, setting of the flag f_Vok1 is maintained (step S35), and the control returns. Namely, the flag f_Vok1 is kept in the OFF state in the case where the flag f_Vok1 was OFF when the last cycle of this routine was executed, and the flag f_Vok1 is kept in the ON state in the case where the flag f_Vok1 was ON when the last cycle of this routine was executed.

When the flag f_Fok and the flag f_Vok1 set through execution of the flowcharts illustrated in FIG. 15 and FIG. 17 are ON, there is a possibility of reaching engine stall when the direct-coupling mode is set, and the driving force is not reduced in the transition period of switching between the HV-Lo mode and the HV-Hi mode. Therefore, it is preferable to perform switching between the HV-Lo mode and the HV-Hi mode without setting the direct-coupling mode. Accordingly, when the flag f_Fok and the flag f_Vok1 are ON, and an affirmative decision (YES) is obtained in step S15 of FIG. 14, the flag f_moveok1 is set to ON (step S16), and the control returns. To the contrary, when one of the flag f_Fok and the flag f_Vok1 is OFF, and a negative decision (NO) is obtained in step S15, the flag f_moveok1 is set to OFF (step S17), and the control returns.

When the flag f_moveok1 is set to OFF based on the flowchart shown in FIG. 14, and thus a negative decision (NO) is obtained in step S1 of FIG. 13, the vehicle is kept placed in the traveling mode that is currently established (step S2). Accordingly, when each of the clutch mechanisms CL1, CL2 is configured to be engaged according to a controlled variable, such as a hydraulic pressure or electric power received, the controlled variable is maintained. When each of the clutch mechanisms CL1, CL2 is a so-called normal-stay type clutch mechanism, it does not particularly receive a control signal. The normal-stay type clutch mechanism is a clutch mechanism configured to be switched from an engaged state to a released state when it receives a control signal for releasing the clutch mechanism, and switched from the released state to the engaged state when it receives a control signal for engaging the clutch mechanism, while being kept in the current state (engaged state or released state) when it receives no control signal for releasing and no signal for engaging.

On the other hand, when the flag f_moveok1 is ON, and an affirmative decision (YES) is obtained in step S1, it is determined whether there is a request for switching from the HV-Lo mode to the HV-Hi mode (step S3). In step S3, it can be determined whether the traveling mode set based on the maps shown in FIG. 11 and FIG. 12, for example, has changed from the HV-Lo mode to the HV-Hi mode, or whether the HV-Lo mode is restricted from being set for various reasons, and there is a request for switching to the HV-Hi mode, though the vehicle is in traveling conditions in which the HV-Lo mode is normally set.

One of the reasons for which the HV-Lo mode is restricted from being set will be briefly described. In the HV traveling mode, the vehicle travels with a combination of torque mechanically transmitted from the engine 5 to the ring gear 18, and torque of the second motor 7. Meanwhile, the upper-limit rotational speed of the engine 5 is set to a lower speed in the HV-Lo mode, than that in the HV-Hi mode, so as to prevent the pinion gears of the power splitting unit 9 from being excessively rotated. As a result, the torque and power delivered from the engine 5 are also smaller in the HV-Lo mode, that those in the HV-Hi mode. However, the splitting ratio of torque distributed to the ring gear 18 side by the power split mechanism 8 is larger in the HV-Lo mode, than that in the HV-Hi mode. Therefore, the torque transmitted from the engine 5 to the ring gear 18 is larger in the HV-Lo mode, than that in the HV-Hi mode. As a result, when the same torque can be delivered from the second motor 7, irrespective of the traveling mode, larger driving force can be obtained in the HV-Lo mode, than that in the HV-Hi mode.

On the other hand, torque transmitted to the first motor 6 side is smaller in the HV-Lo mode, than that in the HV-Hi mode; therefore, electric power generated by the first motor 6 may be smaller in the HV-Lo mode. In this case, electric power that can be supplied from the first motor 6 to the second motor 7 is smaller in the HV-Lo mode, than that in the HV-Hi mode. However, when sufficient electric power can be supplied from the power storage device 47 to the second motor 7, drive torque that can be delivered from the second motor 7 does not change, because it can be delivered from the second motor 7 without depending on electric power generated by the first motor 6. On the other hand, electric power that can be delivered from the power storage device 47 is restricted due to the SOC and the temperature of the power storage device 47, for example, and thus electric power that can be supplied from the power storage device 47 to the second motor 7 may be reduced. In this case, larger drive torque can be delivered from the second motor 7, in the HV-Hi mode in which larger electric power is generated by the first motor 6. Thus, even though the torque transmitted from the engine 5 to the ring gear 18 is smaller in the HV-Hi mode, than that in the HV-Lo mode, as described above, the total drive torque that can be transmitted to the front wheels 1R, 1L may be larger in the HV-Hi mode. In this situation, the HV-Lo mode is restricted from being set. Namely, when electric power that can be delivered from the power storage device 47 is restricted while the vehicle is traveling in the HV-Lo mode, a request for switching to the HV-Hi mode may be made, even though the traveling mode based on the maps shown in FIG. 11 and FIG. 12 is the HV-Lo mode.

When there is a request for switching from the HV-Lo mode to the HV-Hi mode, and an affirmative decision (YES) is obtained in step S3, step S4 and subsequent steps are executed, so as to perform switching from the HV-Lo mode to the HV-Hi mode, without going through the direct-coupling mode. To the contrary, when the traveling mode currently set is not the HV-Lo mode, or when there is no request for switching from the HV-Lo mode to the HV-Hi mode, such as when there is a request for switching from the HV-Lo mode to a traveling mode other than the HV-Hi mode, or when the HV-Lo mode is maintained, and a negative decision (NO) is obtained in step S3, the control proceeds to step S2, in which the current traveling mode is maintained, and the control returns.

In step S4, the operating mode of the engine 5 is switched to the idling mode. In the idling mode, the engine 5 rotates by itself, and the rotational speed of the engine 5 is controlled to the idle speed determined so as to warm up the engine 5, for example, in the same manner as in engine control known in the art. In the idling mode, the opening of the ISC valve 5d is controlled in a feedback fashion, using a difference between the idle speed and the actual engine speed, so that the engine speed becomes equal to the idle speed. Accordingly, the opening of the ISC valve 5d is reduced when the engine speed is higher than the idle speed, and the opening of the ISC valve 5d is increased when the engine speed is lower than the idle speed. The opening of the electronic throttle valve 5b, in addition to or in place of the ISC valve 5d, may be controlled. The idle speed is one example of the "first (second) predetermined rotational speed" in this embodiment of the disclosure.

In this control example, switching from the HV-Lo mode to the HV-Hi mode is performed by, initially, releasing the first clutch mechanism CL1, reducing a difference between the input rotational speed and output rotational speed of the second clutch mechanism CL2, and then engaging the second clutch mechanism CL2. In this case, the control mode of the first motor 6 is the same as that of the HV-Lo mode before the first clutch mechanism CL1 is released, and is switched to synchronization control for reducing a difference between the input rotational speed and output rotational speed of the second clutch mechanism CL2 after the first clutch mechanism CL1 is released. Thus, after execution of step S4, it is determined whether the current control mode is the HV-Lo mode (step S5). The determination in step S5 can be made based on whether the first clutch mechanism CL1 is engaged.

When the current traveling mode is the HV-Lo mode, and an affirmative decision (YES) is obtained in step S5, the target rotational speed of the first motor 6 is set to the current rotational speed, and the output torque (Tg) of the first motor 6 is set to "0" (step S6). The current rotational speed of the first motor 6 can be detected by a resolver (not shown). The control in step S6 is performed when the first clutch mechanism CL1 is a mesh-type clutch mechanism; thus, the output torque of the first motor 6 is set to "0", so as to reduce the frictional force at its engaging or mating faces. Accordingly, when the first clutch mechanism CL1 is a friction-type clutch mechanism, step S6 may not be executed.

After the rotational speed and torque of the first motor 6 are controlled as described above, a control signal for releasing the first clutch mechanism CL1 is generated, and the control returns, without generating a control signal for engaging the second clutch mechanism CL2 (step S7). In step S7, it is only required to release the first clutch mechanism CL1, while keeping the second clutch mechanism CL2 released. Here, since each of the clutch mechanisms CL1, CL2 is a normal-stay type clutch mechanism, it is indicated whether a control signal for engaging or a control signal for releasing is generated.

On the other hand, when the current control mode is not the HV-Lo mode, and a negative decision (NO) is obtained in step S5, namely, when the control mode has shifted to the synchronization control, the target rotational speed of the first motor 6 is set to a rotational speed X1 at which a difference between the input rotational speed and output rotational speed of the second clutch mechanism CL2 becomes equal to "zero", and the output torque of the first motor 6 is set to torque determined through PID control, using a difference between the target rotational speed and the actual rotational speed (step S8). Namely, the torque of the first motor 6 is controlled so that the rotational speed of the first motor 6 follows the target rotational speed.

The target rotational speed X1 of the first motor 6 can be obtained from Eq. (1) or Eq. (2) below. Eq. (1) indicates the relationship among the engine speed Ne, the rotational speed Np of the ring gear 18 of the speed changing unit 10, and the rotational speed Ng of the first motor 6, when the HV-Hi mode is established, and Eq. (2) indicates the relationship among the engine speed Ne, the rotational speed Np of the ring gear 18 of the speed changing unit 10, and the rotational speed Ng of the first motor 6, when the HV-Lo mode is established. Accordingly, in step S8, the idle speed is substituted for Ne in Eq. (1), and the rotational speed of the ring gear 18 corresponding to the current vehicle speed is substituted for Np, so that the target rotational speed X1 of the first motor 6 can be obtained.

$$Ne=(1/(1+\rho1))Np+(\rho1/(1+\rho1))Ng \quad (1)$$

$$Ne=(1/(1-\rho1\times\rho2))Np-((\rho1\times\rho2)/(1-\rho1\times\rho2))Ng \quad (2)$$

Then, it is determined whether the target rotational speed X1 is within a permissible range of the target rotational speed X1 (step S9). The permissible range may be determined based on the quantity of heat generated due to slipping, when each of the clutch mechanisms CL1, CL2 is a friction-type clutch mechanism, and may be determined based on the shape of engaging or mating teeth when it is a mesh-type clutch mechanism. Namely, it is determined in step S9 whether a difference between the input rotational speed and output rotational speed of the clutch mechanism to be engaged is equal to or smaller than a permissible value. Accordingly, the input rotational speed and output rotational speed of the clutch mechanism to be engaged may be respectively detected, in place of the rotational speed of the first motor 6, and it may be determined whether a difference between these rotational speeds is equal to or smaller than the permissible value. In the case where each clutch mechanism CL1, CL2 is a mesh-type clutch mechanism, only the relative rotation in one direction may be allowed, depending on the shape of the engaging teeth. In this case, the permissible range in step S9 may be determined in one direction.

When the rotational speed of the first motor 6 is not within the permissible range of the target rotational speed, and a negative decision (NO) is obtained in step S9, the control returns to step S8. To the contrary, when the rotational speed of the first motor 6 is within the permissible range of the target rotational speed, and an affirmative decision (YES) is obtained in step S9, the control signal for releasing the first clutch mechanism CL1 is kept OFF, and the control signal for engaging the second clutch mechanism CL2 is switched to ON (step S10). Then, the control returns. Namely, the HV-Hi mode is established, by engaging the second clutch mechanism CL2, while keeping the first clutch mechanism CL1 in the released state.

Figure 18:
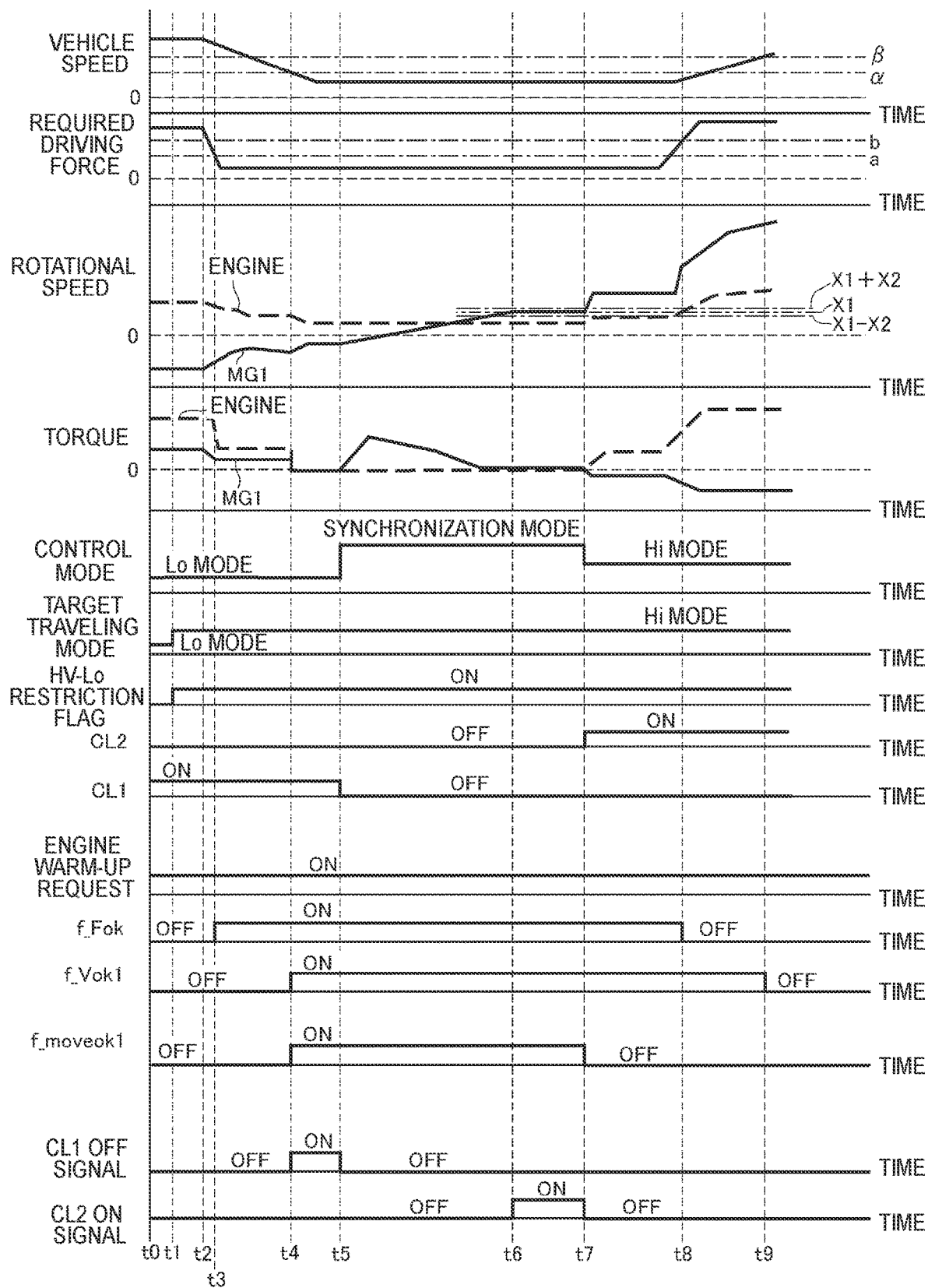
FIG. 18 is a time chart illustrating one example of changes of a control mode, etc. when the vehicle is switched from the HV-Lo mode to the HV-Hi mode, without going through the direct-coupling mode, while traveling at a low speed.

FIG. 18 shows one example of changes of the control mode, etc. in the case where the first drive unit 2 is switched from the HV-Lo mode to the HV-Hi mode, without going through the direct-coupling mode. In the example shown in FIG. 18, a request for warming up the engine 5 is made all the time. At time t0 shown in FIG. 18, the HV-Lo mode is established, and therefore, the engine 5 and the first motor 6 are rotated. Regarding the directions of rotation in FIG. 18, the rotational direction of the engine 5 is indicated as "positive". Also, the required drive torque is delivered from the engine 5, and reaction torque is delivered from the first motor 6. Regarding the direction of torque in FIG. 18, the direction of torque in a direction in which the rotational speed of the engine 5 increases is indicated as "positive". With regard to the first motor 6, the direction of torque in a direction in which the rotational speed of the first motor 6 increases, when the first motor 6 rotates in the same direction as the engine 5, is indicated as "positive", and the direction of torque in a direction in which the rotational speed of the first motor 6 is reduced, when the first motor 6 rotates in a direction opposite to the engine 5, is indicated as "positive".

At time t1, the HV-Lo mode is restricted, and switching to the HV-Hi mode is requested. As a result, a flag for restricting the HV-Lo mode is switched to ON. Also, at time t1, the required driving force is equal to or larger than the first driving force "a", and the vehicle speed is equal to or higher than the first vehicle speed "α"; therefore, both the flag f_Fok and the flag f_Vok1 are OFF. Therefore, the flag f_moveok1 is OFF. As a result, a negative decision (NO) is obtained in step S1 of FIG. 13, and switching from the HV-Lo mode to the HV-Hi mode is not performed.

At time t2, the required driving force starts being reduced, so that the output torque of the engine 5 is reduced, and the reaction torque of the first motor 6 is reduced accordingly. As a result, the driving force is reduced, and thus the vehicle speed starts being reduced. Then, at time t3, the required driving force becomes equal to or smaller than the first driving force "a", so that the flag f_Fok is switched to ON. At time t4, the vehicle speed becomes equal to or lower than the first vehicle speed "α", so that the flag f_Vok1 is switched to ON, and the flag f_moveok1 is also switched to ON. As a result, an affirmative decision (YES) is obtained in step S1 of FIG. 13. Since there is a request for switching from the HV-Lo mode to the HV-Hi mode in the example illustrated in FIG. 18, an affirmative decision (YES) is obtained in step S2 of FIG. 13.

Accordingly, the engine 5 is switched to idling control, and the first motor 6 is controlled so that a difference between the input rotational speed and output rotational speed of the second clutch mechanism CL2 is reduced. Namely, the rotational speed of the first motor 6 is controlled so that the rotational speed of the carrier 20 becomes equal to the rotational speed of the ring gear 18 corresponding to the vehicle speed, and the output torque of the first motor 6 is controlled to "0". At time t4, the control signal for releasing the first clutch mechanism CL1 is switched to ON, so that the first clutch mechanism CL1 starts being released.

When the first clutch mechanism CL1 is released at time t5, the control mode is switched to the synchronization control (synchronization mode). As a result, the target rotational speed of the first motor 6 is set to a rotational speed at which a difference between the input rotational speed and output rotational speed of the second clutch mechanism CL2 becomes equal to "0", and the output torque of the first motor 6 is controlled, based on a difference between the target rotational speed X1 and the actual rotational speed. Accordingly, in the example shown in FIG. 18, the rotational speed of the first motor 6 gradually increases in the positive direction, and the output torque of the first motor 6 temporarily increases from time t5.

Then, when the rotational speed of the first motor 6 falls within the permissible range of the target rotational speed X1 (at time t6), an affirmative decision (YES) is obtained in step S9 of FIG. 13, and therefore, the control signal for engaging the second clutch mechanism CL2 is switched to ON. Then, the second clutch mechanism CL2 is engaged at time t7, and the request for switching from the HV-Lo mode to the HV-Hi mode is eliminated; thus, a negative decision (NO) is obtained in step S3 of FIG. 13. As a result, the engine 5 and the first motor 6 are controlled so that the vehicle travels in the HV-Hi mode.

In the example shown in FIG. 18, after the HV-Hi mode is established, the output torque of the engine 5 is increased, and the reaction torque of the first motor 6 is increased, so that the driving force is increased, and the vehicle is accelerated accordingly. Then, at time t8, the required driving force becomes equal to or larger than the second driving force "b", so that the flag f_Fok is switched to OFF, and the flag f_moveok1 is switched to OFF. Also, at time t9, the vehicle speed becomes equal to or higher than the second vehicle speed "β", so that the flag f_Vok1 is switched to OFF.

Figure 19:
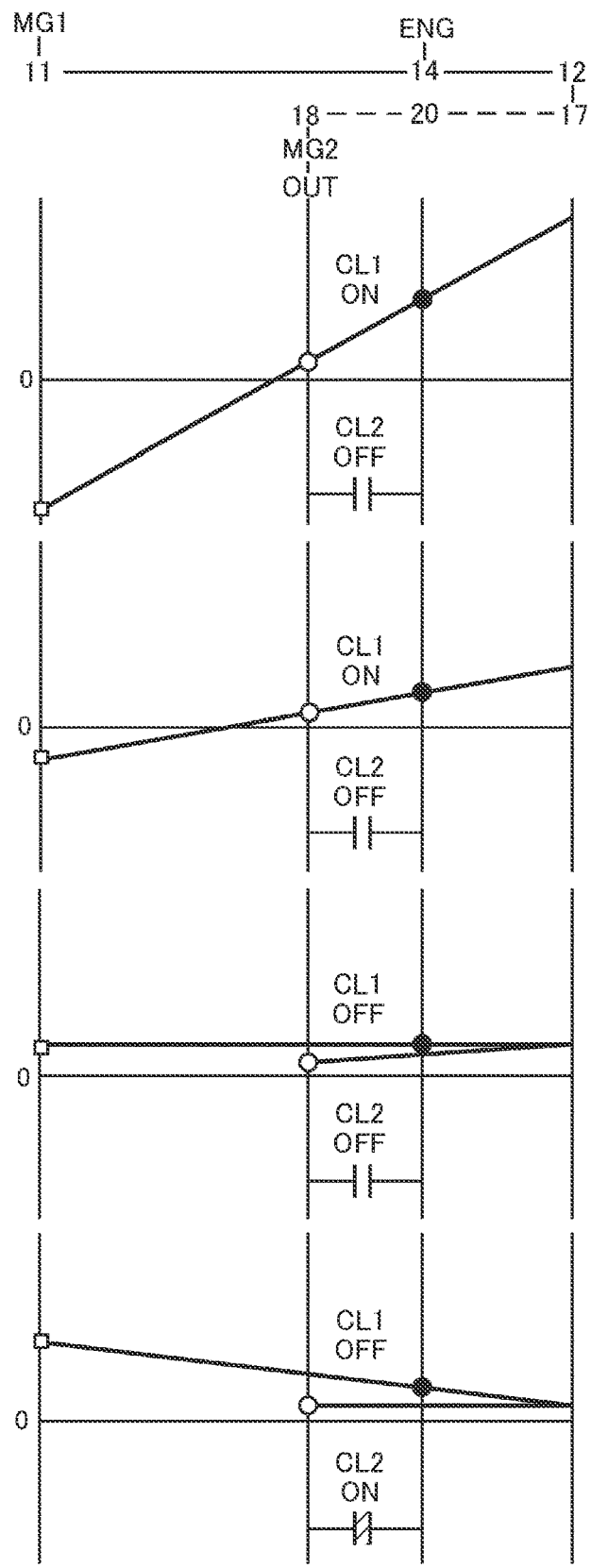
FIG. 19 is a nomographic chart illustrating change of the rotational speed of each rotating element of a power split mechanism when the vehicle is switched from the HV-Lo mode to the HV-Hi mode while traveling at a low speed.

FIG. 19 shows changes of the rotational speeds of the respective rotating elements of the power split mechanism 8 in the transition period of switching from the HV-Lo mode to the HV-Hi mode. The top nomographic chart in FIG. 19 shows a condition in which the HV-Lo mode is established; thus, the engine 5 and the first motor 6 are controlled, in the same manner as in the example shown in FIG. 6.

In this condition, when switching from the HV-Lo mode to the HV-Hi mode is started, the engine 5 is initially subjected to idling control, and the output torque of the first motor 6 is controlled to "0". Accordingly, the rotational speed of the engine 5 is reduced down to the idle speed, as shown in the second nomographic chart from the top in FIG. 19, and the rotational speed of the first motor 6 is reduced accordingly.

Then, the first clutch mechanism CL1 is released, so that the carrier 14 and the carrier 20 can rotate relative to each other. Therefore, the rotational speeds of the engine 5 and the first motor 6 can be varied, irrespective of the vehicle speed. As a result, in the second nomographic chart from the bottom in FIG. 19, the rotational speed of the ring gear 12 varies, according to the rotational speed of the first motor 6, the rotational speed of the engine 5, and the ratio of the number of teeth of the sun gear 11 and the number of teeth of the ring gear 12 in the power splitting unit 9. Since the rotational speed of the engine 5 is set to the idle speed as described above, it is possible to make the rotational speed of the ring gear 12 equal to the rotational speed of the ring gear 18, by controlling the rotational speed of the first motor 6. In other words, the carrier 20 as the input-side rotating member of the second clutch mechanism CL2 can be rotated at the same speed as the ring gear 18 as the output-side rotating member. Therefore, in the second nomographic chart from the bottom in FIG. 19, the rotational speed of the first motor 6 is controlled toward the target rotational speed, while the first motor 6 and the engine 5 are rotated in the same rotational direction.

Then, at a point in time at which the rotational speeds of the respective rotating elements in the speed changing unit 10 become equal as shown in the bottom nomographic chart in FIG. 19, the second clutch mechanism CL2 is engaged, so that the HV-Hi mode is established.

By switching the first drive unit 2 between the HV-Lo mode and the HV-Hi mode without going through the direct-coupling mode while the vehicle is traveling at a low vehicle speed, as described above, the engine speed can be made less likely or unlikely to be excessively reduced. As a result, the possibility of reaching engine stall can be reduced. The natural frequency of the power split mechanism 8, etc. is a relatively low frequency because of its structure; therefore, it is possible to make the engine speed less likely or unlikely to coincide with the natural frequency of the power split mechanism 8, etc., by curbing reduction of the engine speed. As a result, noise is less likely or unlikely to occur due to increase of vibration of the power split mechanism 8, etc. Further, even in a situation where the engine 5 cannot be stopped, such as when warm-up of the engine 5 is requested, or in a situation where the operating point of the engine 5 cannot be largely changed, switching between the HV-Lo mode and the HV-Hi mode can be performed. Further, switching between the HV-Lo mode and the HV-Hi mode is carried out when the required driving force is low, so that the amount of driving force reduced in the transition period of switching between the HV-Lo mode and the HV-Hi mode can be delivered from the second motor 7. As a result, reduction of the driving force and occurrence of shock can be curbed, and the driver is less likely or unlikely to feel strange or uncomfortable. The clutch mechanism is engaged, after a difference between the input rotational speed and output rotational speed of the clutch mechanism to be engaged is reduced by the first motor 6; therefore, shock caused by engagement of the clutch mechanism can be reduced.

Figure 20:
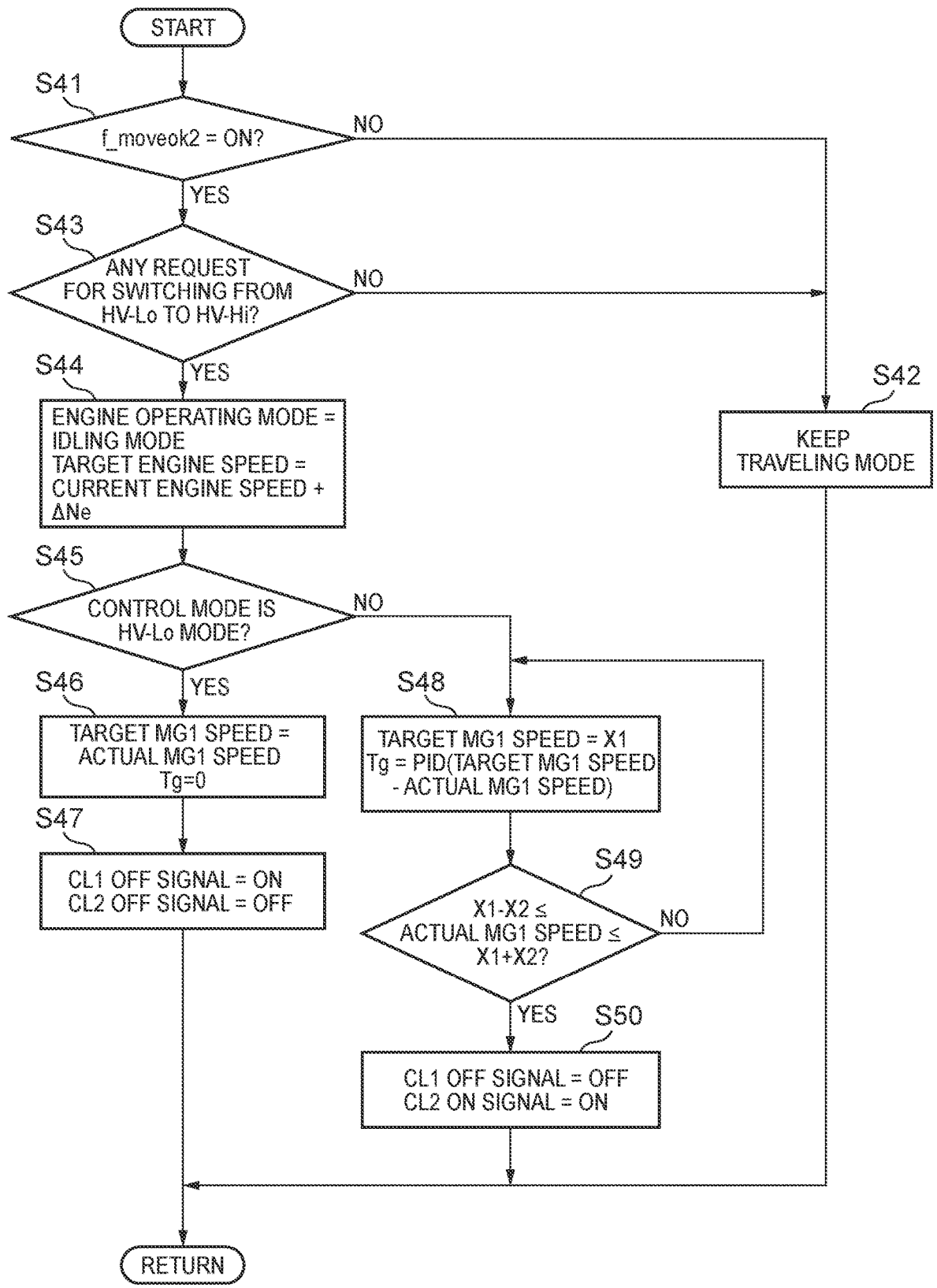
FIG. 20 is a flowchart illustrating one example of control for switching the vehicle from the HV-Lo mode to the HV-Hi mode, while controlling the engine speed according to accelerator operation of the driver.

Next, one example of control for switching from the HV-Lo mode to the HV-Hi mode, while controlling the engine speed according to the accelerator operation of the driver, will be described. FIG. 20 is a flowchart illustrating one example of the control. In the example shown in FIG. 20, it is initially determined whether a flag f_moveok2 that is set to ON when there is a request to change the engine speed according to the accelerator operation is ON (step S41).

Figure 21:
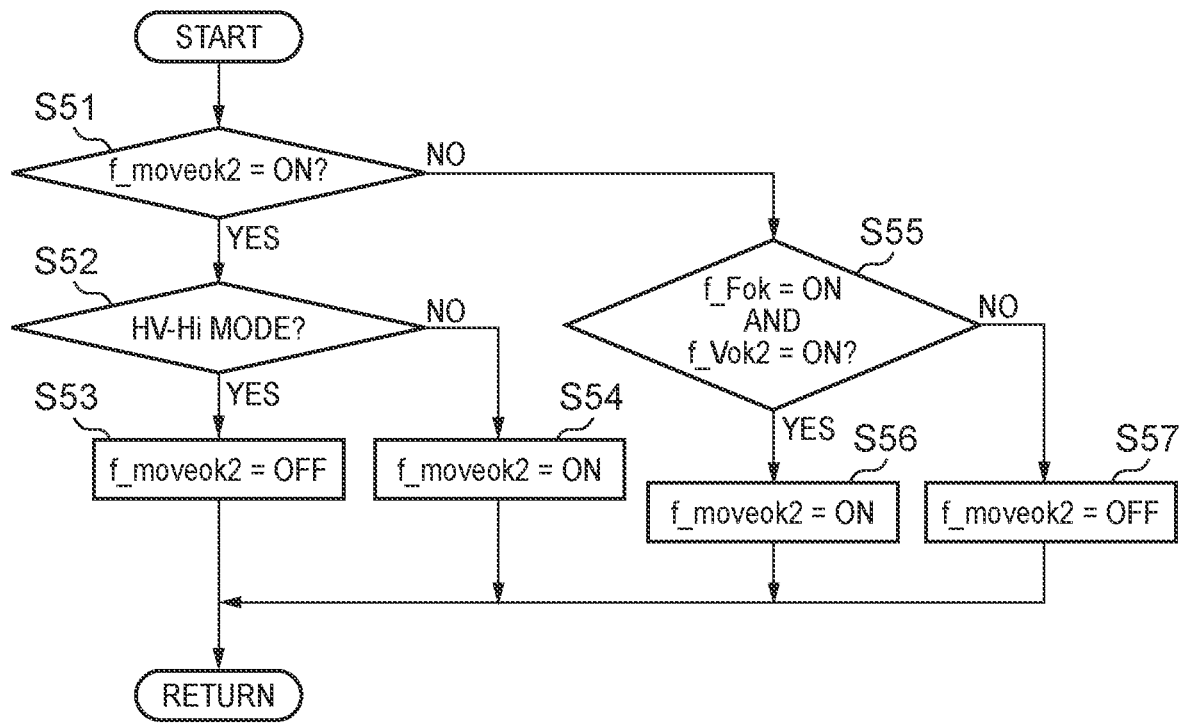
FIG. 21 is a flowchart illustrating a control example for setting a flag f_moveok2.

FIG. 21 shows one example of a flowchart for setting the flag f_moveok2. In the example shown in FIG. 21, it is initially determined whether the flag f_moveok2 is currently ON (step S51). Namely, it is determined whether the control returned in a condition where the flag f_moveok2 was set to ON, when the last cycle of the flowchart shown in FIG. 21 was executed.

When the flag f_moveok2 is currently ON, and an affirmative decision (YES) is obtained in step S51, it is determined whether the traveling mode that is currently set is the HV-Hi mode (step S52). The determination in step S52 can be made according to conditions of the clutch mechanisms CL1, CL2 and conditions of the engine 5 and the motors 6, 7, as in step S12 of FIG. 14 as described above.

When the traveling mode that is currently set is the HV-Hi mode, and an affirmative decision (YES) is obtained in step S52, the flag f_moveok2 is switched to OFF (step S53), and the control returns. To the contrary, when the traveling mode that is currently set is not the HV-Hi mode, namely, when the traveling mode currently set is the HV-Lo mode, or direct-coupling mode, or EV traveling mode, and a negative decision (NO) is obtained in step S52, the flag f_moveok2 is kept ON (step S54), and the control returns.

On the other hand, when the flag f_moveok2 is currently OFF, and a negative decision (NO) is obtained in step S51, it is determined whether the flag f_Fok and the flag f_Vok2 are ON (step S55). The flag f_Fok in step S55 is the same as the flag f_Fok in step S15 of FIG. 14. Accordingly, the flag f_Fok is switched between ON and OFF, by executing the routine of the flowchart shown in FIG. 15.

In the meantime, when the vehicle travels at a relatively high speed, it is preferable to change the engine speed in accordance with the accelerator operation, when switching from the HV-Hi mode to the HV-Lo mode is performed. This is because the engine rotates at a relatively high speed when the vehicle travels at a high speed. On the other hand, when the vehicle travels at a low speed, the engine also rotates at a low speed, and the driver will not feel strange or uncomfortable even if the amount of change in the engine speed is small when the accelerator operation amount is reduced.

Figure 22:
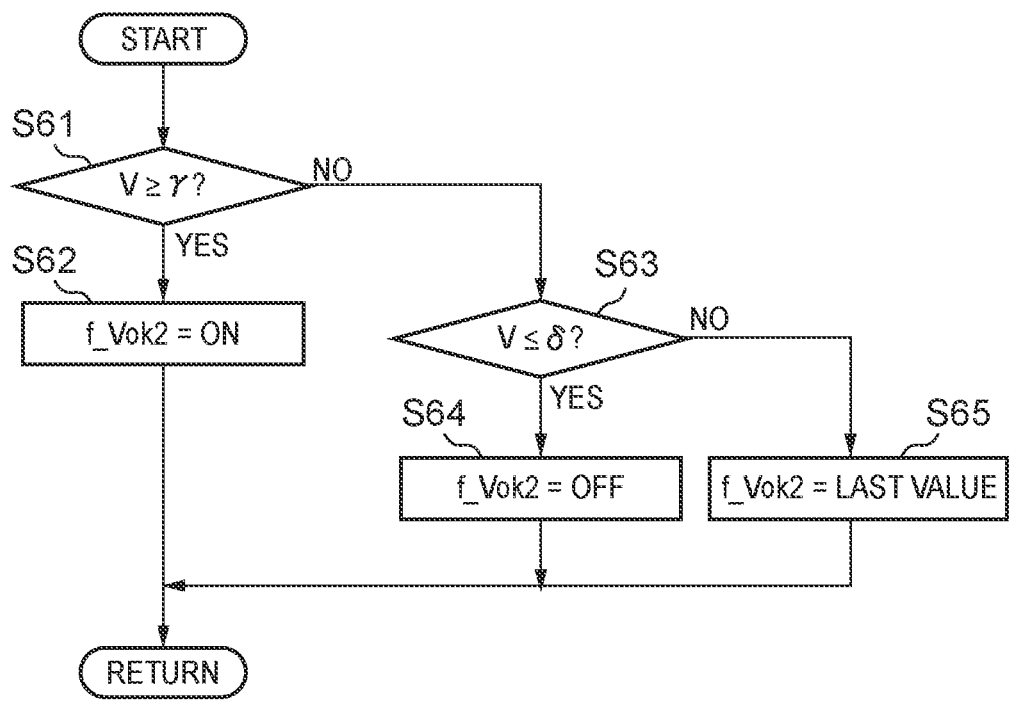
FIG. 22 is a flowchart illustrating a control example for setting a flag f_Vok2.

In the control example shown herein, the flag f_Vok2 is set, by executing the routine of the flowchart illustrated in FIG. 22. In the example shown in FIG. 22, it is initially determined whether the vehicle speed V is equal to or higher than a third vehicle speed γ (step S61). As described above, when the rotational speed of the first motor 6 is controlled so as to provide a high efficiency of the first drive unit 2 as a whole, the engine speed increases as the vehicle speed is higher. The vehicle speed at which the driver would feel strange or uncomfortable if the engine speed does not change in accordance with the accelerator operation amount, when the rotational speed of the first motor 6 is controlled in the above manner, is obtained in advance by experiment, or the like, and the vehicle speed thus obtained is set as the third vehicle speed "γ". The third vehicle speed "γ" is one example of "second predetermined vehicle speed" in this embodiment of the disclosure.

When the vehicle speed V is equal to or higher than the third vehicle speed "γ", and an affirmative decision (YES) is obtained in step S61, the flag f_Vok2 is set to ON (step S62), and the control returns. To the contrary, when the vehicle speed V is lower than the third vehicle speed "γ", and a negative decision (NO) is obtained in step S61, it is determined whether the vehicle speed V is equal to or lower than a fourth vehicle speed δ (step S63). This step S63 is provided for determining whether the flag f_Vok2 is to be switched to OFF. Accordingly, the fourth vehicle speed "δ" is set to a vehicle speed that is lower than the third vehicle speed "γ". In this connection, the third vehicle speed "γ" may be higher than or equal to the second vehicle speed "β" in FIG. 17. Similarly, the fourth vehicle speed "δ" may be higher than or equal to the first vehicle speed "α" in FIG. 17.

When the vehicle speed V is equal to or lower than the fourth vehicle speed "δ", and an affirmative decision (YES) is obtained in step S63, the flag f_Vok2 is set to OFF (step S64), and the control returns. To the contrary, when the vehicle speed V is higher than the fourth vehicle speed "δ", and a negative decision (NO) is obtained in step S63, setting of the flag f_Vok2 is maintained (step S65), and the controller returns. Namely, the flag f_Vok2 is kept in the OFF state if the flag f_Vok2 was OFF when the last cycle of this routine was executed, and the flag f_Vok2 is kept in the ON state if the flag f_Vok2 was ON when the last cycle of this routine was executed.

When the flag f_Fok and the flag f_Vok2 set by executing the routines of the flowcharts shown in FIG. 15 and FIG. 22 are ON, the driver may feel strange or uncomfortable unless the engine speed changes according to the accelerator operation, and the driving force is not reduced in the transition period of switching between the HV-Lo mode and the HV-Hi mode. Therefore, it is preferable to perform switching between the HV-Lo mode and the HV-Hi mode without setting the direct-coupling mode. Accordingly, when the flag f_Fok and the flag f_Vok2 are ON, and an affirmative decision (YES) is obtained in step S55 of FIG. 21, the flag f_moveok2 is set to ON (step S56), and the control returns. To the contrary, when one of the flag f_Fok and the flag f_Vok2 is OFF, and a negative decision (NO) is obtained in step S55, the flag f_moveok2 is set to OFF (step S57), and the control returns.

When the flag f_moveok2 is set to OFF based on the flowchart shown in FIG. 21, and a negative decision (NO) is obtained in step S41 of FIG. 20, the traveling mode that is currently set is maintained (step S42). This step S42 is identical with step S2 of FIG. 13.

On the other hand, when the flag f_moveok2 is ON, and an affirmative decision (YES) is obtained in step S41, it is determined whether there is a request for switching from the HV-Lo mode to the HV-Hi mode (step S43). This step S43 is identical with step S3 of FIG. 13.

When there is a request for switching from the HV-Lo mode to the HV-Hi mode, and an affirmative decision (YES) is obtained in step S43, step S44 and subsequent steps are executed, so that the first drive unit 2 is switched from the HV-Lo mode to the HV-Hi mode, without going through the direct-coupling mode. To the contrary, when the traveling mode currently set is not the HV-Lo mode, or when there is no request for switching from the HV-Lo mode to the HV-Hi mode, such as when there is a request for switching from the HV-Lo mode to a traveling mode other than the HV-Hi mode, or when the HV-Lo mode is maintained, and a negative decision (NO) is obtained in step S43, the control proceeds to step S42, namely, maintains the current traveling mode, and then returns.

Figure 23:
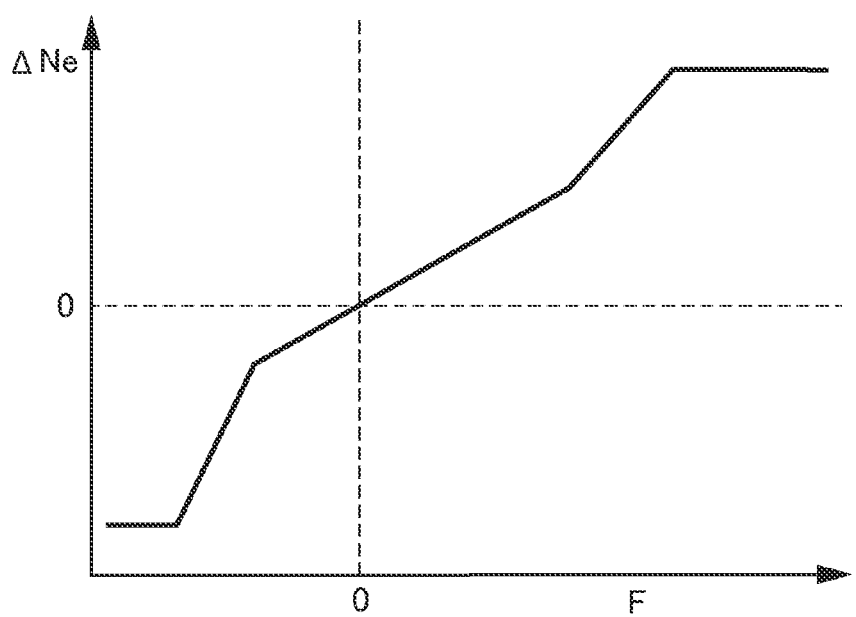
FIG. 23 is a view showing one example of a map for determining the amount of change of the engine speed in the process of switching from the HV-Lo mode to the HV-Hi mode.

In step S44, the operating mode of the engine is switched to the idling mode, and the target rotational speed of the engine 5 during idling is set to a value obtained by adding a predetermined rotational speed ΔNe to the current engine speed. The predetermined rotational speed ΔNe is determined according to the accelerator operation. Namely, the target rotational speed of the engine 5 during idling is determined, so that the engine speed changes according to the accelerator operation. In FIG. 23 showing a map used for determining the predetermined rotational speed ΔNe, the horizontal axis indicates the required driving force F, and the vertical axis indicates the predetermined rotational speed ΔNe. As shown in FIG. 23, the predetermined rotational speed ΔNe is determined so as to increase as the required driving force F is larger. When the required driving force is a negative value, namely, when a request for deceleration is made, the predetermined rotational speed ΔNe assumes a negative value. Accordingly, when the accelerator operation amount is relatively small, the engine speed is gradually reduced. The map shown in FIG. 23 can be prepared in advance, by performing sensory tests, for example. The engine speed may be controlled by controlling the opening of the ISC valve 5d or the electronic throttle valve 5b, as in step S4 of FIG. 13. The required driving force F is detected all the time, and the predetermined rotational speed ΔNe is updated each time the control routine is executed. The predetermined rotational speed ΔNe may also be determined based on the accelerator operation amount or power required to be generated by the vehicle, in place of the required driving force. The target rotational speed set in step S44 is one example of "first (second) predetermined rotational speed" in this embodiment of the disclosure.

In this control example, switching from the HV-Lo mode to the HV-Hi mode is performed by initially releasing the first clutch mechanism CL1, reducing a difference between the input rotational speed and output rotational speed of the second clutch mechanism CL2, and then engaging the second clutch mechanism CL2. In this case, the control mode of the first motor 6 is the same as that of the HV-Lo mode before the first clutch mechanism CL1 is released, and is switched to the synchronization control for reducing the difference between the input rotational speed and output rotational speed of the second clutch mechanism CL2, after the first clutch mechanism CL1 is released. Thus, after execution of step S44, it is determined whether the current control mode is the HV-Lo mode (step S45). This step S45 is identical with step S5 of FIG. 13.

When the current traveling mode is the HV-Lo mode, and an affirmative decision (YES) is obtained in step S45, the target rotational speed of the first motor 6 is set to the current rotational speed, and the output torque (Tg) of the first motor 6 is set to "0" (step S46). Then, a control signal for releasing the first clutch mechanism CL1 is generated, and the control returns, without generating a control signal for engaging the second clutch mechanism CL2 (step S47). These step S46 and step S47 are identical with step S6 and step S7 of FIG. 13, respectively.

On the other hand, when the current control mode is not the HV-Lo mode, and a negative decision (NO) is obtained in step S45, namely, when the control mode has shifted to the synchronization control, the target rotational speed of the first motor 6 is set to a rotational speed X1 at which the difference between the input rotational speed and output rotational speed of the second clutch mechanism CL2 becomes equal to "0", and the output torque of the first motor 6 is set to torque determined through PID control, using a difference between the target rotational speed and the actual rotational speed (step S48). Namely, the torque of the first motor 6 is controlled so that the rotational speed of the first motor 6 follows the target rotational speed.

The target rotational speed X1 can be obtained from the above-indicated Eq. (1) or (2). Meanwhile, in this control example, the engine speed changes according to the accelerator operation, as explained above in step S44; therefore, the target rotational speed X1 of the first motor 6 also changes according to change of the engine speed. The target rotational speed X1 of the first motor 6 also changes according to change of the vehicle speed. Thus, the target rotational speed X1 determined in step S48 varies each time this routine is executed.

Then, it is determined whether the rotational speed of the first motor 6 falls within a permissible range of the target rotational speed X1 (step S49). This step S49 is identical with step S9 of FIG. 13. The permissible range may be the same as or similar to that of step S9 of FIG. 13.

When the rotational speed of the first motor 6 is not within the permissible range of the target rotational speed, and a negative decision (NO) is obtained in step S49, the control returns to step S48. To the contrary, when the rotational speed of the first motor 6 is within the permissible range of the target rotational speed, and an affirmative decision (YES) is obtained in step S49, the control signal for releasing the first clutch mechanism CL1 is kept OFF, and the control signal for engaging the second clutch mechanism CL2 is switched to ON (step S50). Then, the control returns. Namely, the HV-Hi mode is established, by engaging the second clutch mechanism CL2 while keeping the first clutch mechanism CL1 in the released state.

Figure 24:
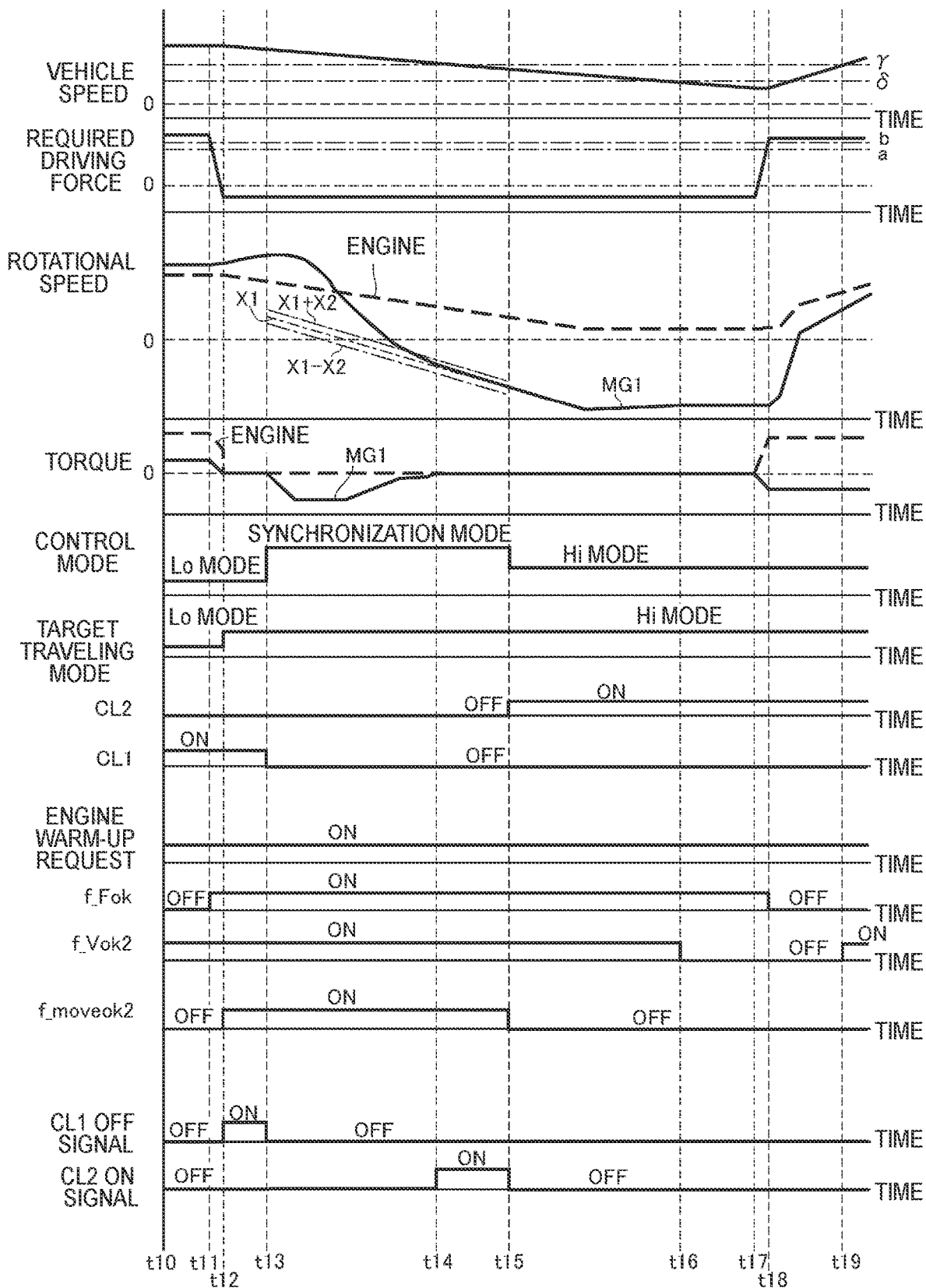
FIG. 24 is a time chart illustrating one example of changes of the control mode, etc. when the vehicle is switched from the HV-Lo mode to the HV-Hi mode, while controlling the engine speed according to the accelerator operation of the driver.

FIG. 24 shows one example of changes of the control mode, etc. when the control example shown in FIG. 20 is carried out. In the example shown in FIG. 24, a request to warm up the engine 5 is made all the time. At time t10 shown in FIG. 24, the HV-Lo mode is established, and thus the engine 5 and the first motor 6 are rotated. Regarding the direction of rotation in FIG. 24, the rotational direction of the engine 5 is indicated as "positive". Also, the required drive torque is delivered from the engine 5, and reaction torque is delivered from the first motor 6. Regarding the direction of torque in FIG. 24, the direction of torque in a direction in which the rotational speed of the engine 5 increases is indicated as "positive". With regard to the first motor 6, the direction of torque in a direction in which the rotational speed of the first motor 6 increases, when the first motor 6 rotates in the same direction as the engine 5, is indicated as "positive", and the direction of torque in a direction in which the rotational speed of the first motor 6 is reduced, when the first motor 6 rotates in a direction opposite to the engine 5, is indicated as "positive".

The required driving force starts being reduced at time t11, so that the output torque of the engine 5 is reduced, and the reaction torque of the first motor 6 is reduced accordingly. As a result, the driving force is reduced, and therefore, the vehicle speed starts being reduced. At the same time as time t11 or at a point slightly later than time t11, the required driving force becomes equal to or smaller than the first driving force "a", so that the flag f_Fok is switched to ON.

At time t1, the vehicle speed is higher than the third vehicle speed γ; therefore, the flag f_Vok2 is ON. Accordingly, at time t12 a little later than time t11, the flag f_moveok2 is switched to ON. As a result, an affirmative decision (YES) is obtained in step S41 of FIG. 20. Also, in this example, there is a request for switching from the HV-Lo mode to the HV-Hi mode; therefore, an affirmative decision (YES) is obtained in step S43 of FIG. 20.

Accordingly, the engine 5 is switched to idling control, and the first motor 6 is controlled so as to reduce a difference between the input rotational speed and output rotational speed of the second clutch mechanism CL2. Namely, the rotational speed of the first motor 6 is controlled so that the rotational speed of the carrier 20 becomes equal to the rotational speed of the ring gear 18 corresponding to the vehicle speed, and the output torque of the first motor 6 is controlled to "0". Further, at time t12, the control signal for releasing the first clutch mechanism CL1 is switched to ON, so that the first clutch mechanism CL1 starts being released.

At time t13, the first clutch mechanism CL1 is released, and the control mode is switched to the synchronization control (synchronization mode). As a result, the target rotational speed of the first motor 6 is set to a rotational speed at which the difference between the input rotational speed and output rotational speed of the second clutch mechanism CL2 becomes equal to "0", and the output torque of the first motor 6 is controlled based on a difference between the target rotational speed X1 and the actual rotational speed. Accordingly, in the example shown in FIG. 24, the rotational speed of the first motor 6 gradually increases in a negative direction, and the output torque of the first motor 6 temporarily increases in a negative direction from time t13.

Then, the rotational speed of the first motor 6 falls within a permissible range of the target rotational speed X1 (time t14), so that an affirmative decision (YES) is obtained in step S49 of FIG. 20; therefore, the control signal for engaging the second clutch mechanism CL2 is switched to ON. Then, the second clutch mechanism CL2 is engaged at time t15, and the request for switching from the HV-Lo mode to the HV-Hi mode is eliminated; therefore, a negative decision (NO) is obtained in step S43 of FIG. 20. As a result, the engine 5 and the first motor 6 are controlled so that the vehicle travels in the HV-Hi mode.

In the example shown in FIG. 24, the vehicle speed is kept reduced even after the HV-Hi mode is established. Therefore, the vehicle speed becomes lower than the fourth vehicle speed "δ" at time t16, so that the flag f_Vok2 is switched to OFF. Then, the required driving force starts increasing at time t17, and becomes equal to or larger than the second driving force "b" at time t18, so that the flag f_Fok is switched to OFF. The vehicle is accelerated from time t18, and the vehicle speed becomes equal to or higher than the third vehicle speed "γ" at time t19, so that the flag f_Vok2 is switched to ON.

Figure 25:
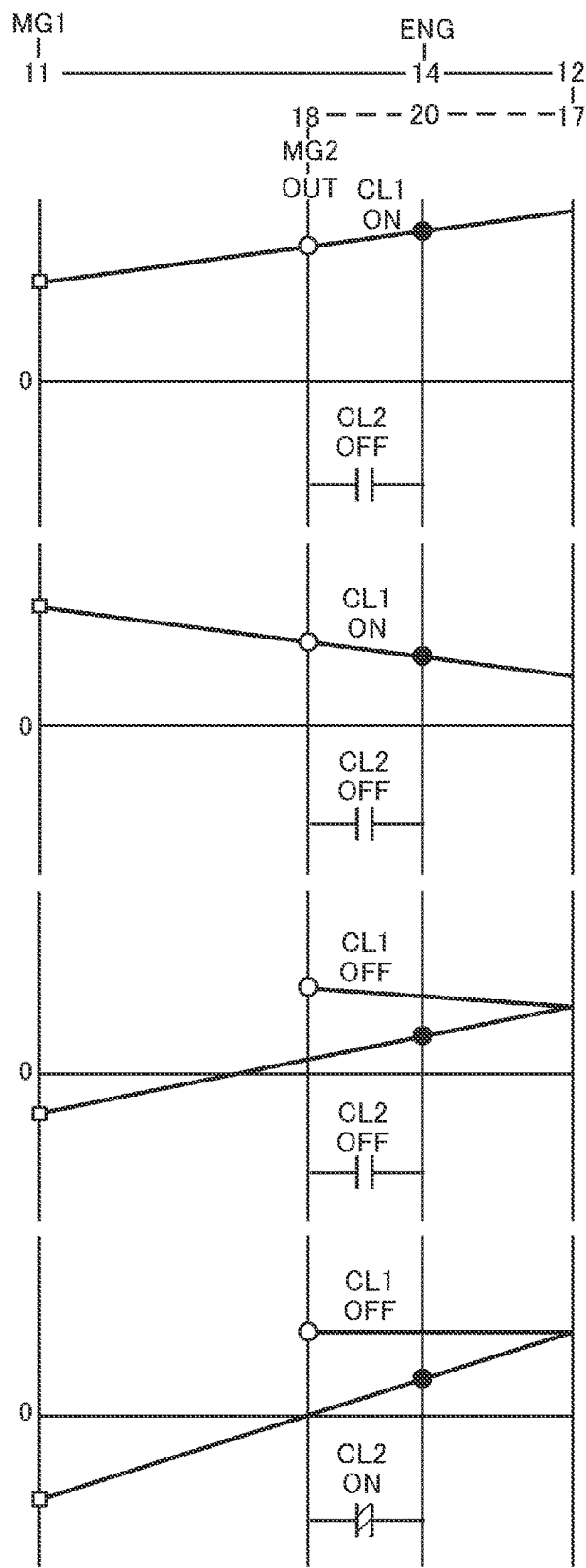
FIG. 25 is a nomographic chart illustrating change of the rotational speed of each rotating element of a power split mechanism when the vehicle is switched from the HV-Lo mode to the HV-Hi mode, while controlling the engine speed according to the accelerator operation of the driver.

FIG. 25 shows change of the rotational speed of each rotating element of the power split mechanism 8 in the transition period of switching from the HV-Lo mode to the HV-Hi mode. The top nomographic chart in FIG. 25 shows a condition where the HV-Lo mode is established, and the engine 5 and the first motor 6 are controlled, in the same manner as in the example shown in FIG. 6. Meanwhile, the vehicle travels at a high speed, so that the engine speed is kept at a relatively high speed.

If switching from the HV-Lo mode to the HV-Hi mode is started in this condition, the engine 5 is initially subjected to idling control, and the output torque of the first motor 6 is controlled to "0". Accordingly, as shown in the second nomographic chart from the top in FIG. 25, the rotational speed of the engine 5 is reduced toward the idle speed, and the rotational speed of the first motor 6 is reduced accordingly.

Then, the first clutch mechanism CL1 is released, so that the carrier 14 and the carrier 20 can rotate relative to each other. Therefore, the rotational speeds of the engine 5 and the first motor 6 can be varied, irrespective of the vehicle speed. As a result, the rotational speed of the ring gear 12 varies, according to the rotational speed of the first motor 6, the rotational speed of the engine 5, and the ratio of the number of teeth of the sun gear 11 and the number of teeth of the ring gear 12 in the power splitting unit 9, as shown in the second nomographic chart from the bottom in FIG. 25. As described above, the rotational speed of the engine 5 is controlled irrespective of the first motor 6, by controlling the ISC valve 5d, for example. Therefore, the rotational speed of the ring gear 12 can be made equal to the rotational speed of the ring gear 18, by controlling the rotational speed of the first motor 6. In other words, the carrier 20 as the input-side rotating member of the second clutch mechanism CL2 and the ring gear 18 as the output-side rotating member can be rotated at the same rotational speed. Therefore, in the second nomographic chart from the bottom in FIG. 25, the rotational direction of the first motor 6 is opposite to that of the engine 5, and the rotational speed of the first motor 6 is controlled toward the target rotational speed.

Then, at the time when the rotational speeds of the respective rotating elements in the speed changing unit 10 become equal as shown in the bottom nomographic chart in FIG. 25, the second clutch mechanism CL2 is engaged, so that the HV-Hi mode is established.

By performing switching between the HV-Lo mode and the HV-Hi mode without going through the direct-coupling mode as described above, it is possible to change the engine speed in accordance with change of the accelerator operation (the required driving force). Namely, change of the engine speed expected by the driver is less likely or unlikely to deviate from change of the actual engine speed. As a result, the first drive unit 2 can be switched between the HV-Lo mode and the HV-Hi mode, without causing the driver to feel strange or uncomfortable. Also, even in a situation where the engine 5 cannot be stopped, such as when there is a request to warm up the engine 5, switching between the HV-Lo mode and the HV-Hi mode can be performed. Further, switching between the HV-Lo mode and the HV-Hi mode is performed while the required driving force is small; therefore, the amount of driving force reduced in the transition period of switching between the HV-Lo mode and the HV-Hi mode can be delivered from the second motor 7. As a result, reduction of the driving force and occurrence of shock can be curbed, and the driver is less likely or unlikely to feel strange or uncomfortable.

This disclosure is not limited to the above embodiments, but may be changed as needed without departing from the object of the disclosure. More specifically, the disclosure may be applied to a vehicle that includes at least two engagement mechanisms, and is configured to set a low mode by engaging one of the engagement mechanisms, set a high mode by engaging the other engagement mechanism, and set a direct-coupling mode by engaging both of the engagement mechanisms. Referring to FIG. 26 through FIG. 31, other vehicle configurations, and operating conditions of the respective rotating elements when the HV-Hi mode and the HV-Lo mode are set, will be described. In these figures, the same reference numerals are assigned to the same or corresponding components as those in the example shown in FIG. 1.

Figure 26:
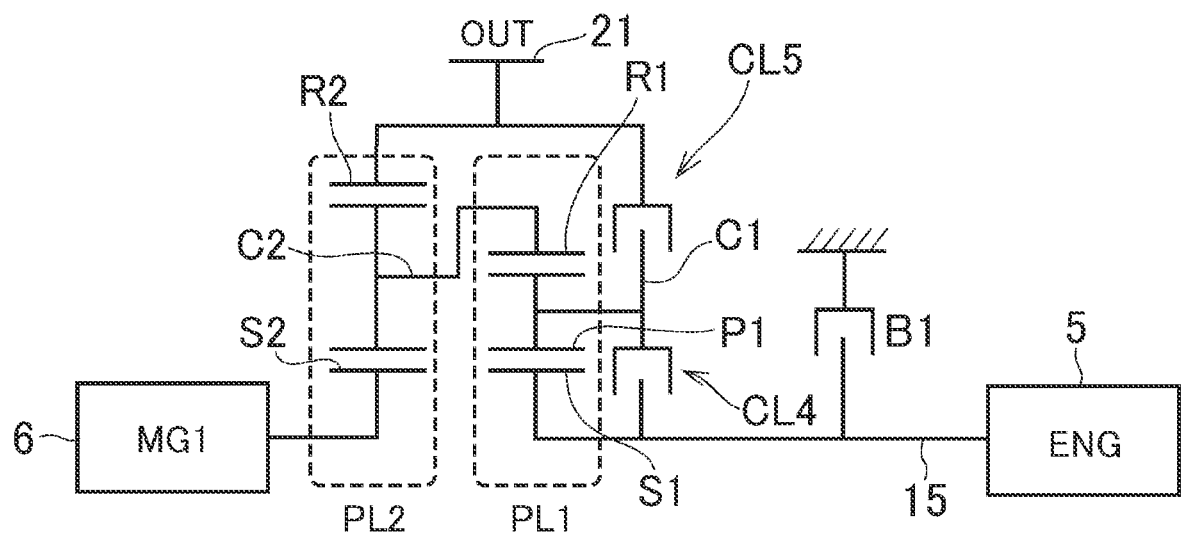
FIG. 26 is a skeleton diagram illustrating another configuration of a vehicle to which the disclosure can be applied.

FIG. 26 is a skeleton diagram illustrating another configuration of a vehicle according to one embodiment of the disclosure. The vehicle shown in FIG. 26 includes a first differential mechanism PL1 to which the engine 5 is directly coupled, and a second differential mechanism PL2 to which the first motor 6 is directly coupled.

The first differential mechanism PL1 is in the form of a single pinion type planetary gear mechanism including a sun gear S1 coupled to the output shaft 15 (or the input shaft 16) of the engine 5, a ring gear R1 disposed concentrically with the sun gear S1, pinion gears P1 that mesh with the sun gear S1 and the ring gear R1, and a carrier C1 that holds the pinion gears P1 such that the pinion gears P1 can rotate about themselves and about the axis of the first differential mechanism PL1.

The second differential mechanism PL2 is in the form of a single pinion type planetary gear mechanism including a sun gear S2 coupled to the first motor 6, a carrier C2 coupled to the ring gear R1 of the first differential mechanism PL1, and a ring gear R2 coupled to the output gear 21. As in the example shown in FIG. 1, the driven gear 23 is coupled to the output gear 21, so that torque can be transmitted to the front wheels 1R. 1L.

The vehicle shown in FIG. 26 further includes a fourth clutch mechanism CL4 configured to engage the sun gear S1 with the carrier C1 in the first differential mechanism PL1, so that the rotating elements that constitute the first differential mechanism PL1 rotate as a unit, and a fifth clutch mechanism CL5 configured to engage the carrier C1 of the first differential mechanism PL1 with the ring gear R2 of the second differential mechanism PL2. The brake mechanism B1 is provided on the output shaft 15 of the engine 5. Like the first clutch mechanism CL1 and the second clutch mechanism CL2, the fourth clutch mechanism CL4 and the fifth clutch mechanism CL5 may be friction type clutch mechanisms, or may be mesh type clutch mechanisms.

The vehicle as described above can be placed in the HV-Hi mode in which the proportion of torque transmitted to the ring gear R2 is small, by engaging the fourth clutch mechanism CL4, and can be placed in the HV-Lo mode in which the proportion of torque transmitted to the ring gear R2 is large, by engaging the fifth clutch mechanism CL5.

Figure 27:
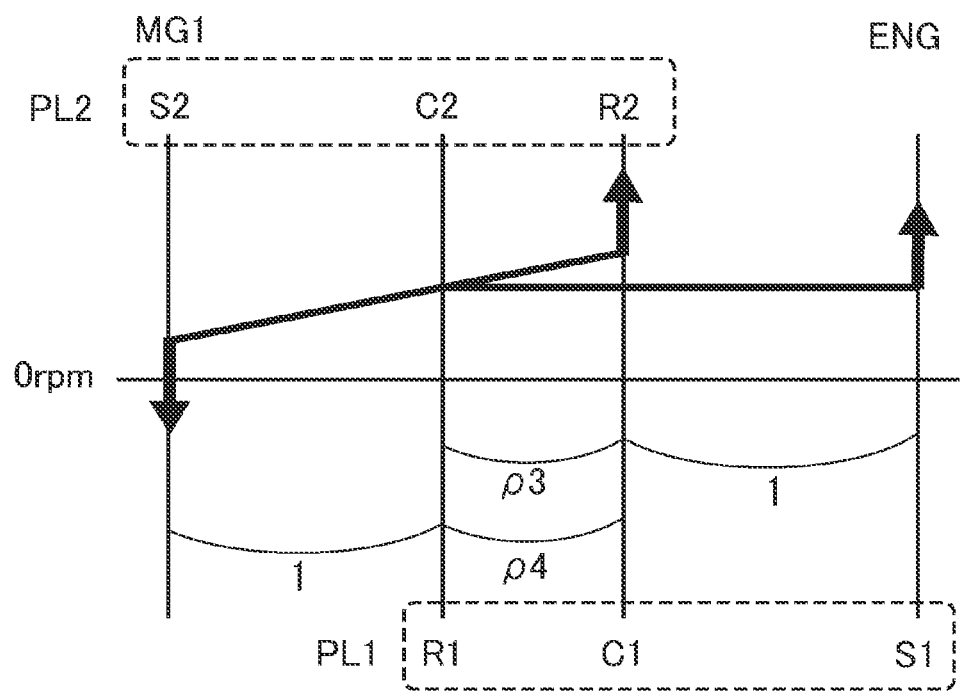
FIG. 27 is a nomographic chart illustrating operating conditions of each rotating element when the vehicle shown in FIG. 26 is placed in the HV-Hi mode.

FIG. 27 is a nomographic chart illustrating operating conditions of respective rotating elements when the vehicle of FIG. 26 is placed in the HV-Hi mode. In the HV-Hi mode, the fourth clutch mechanism CL4 is engaged, as described above. Accordingly, the rotating elements that constitute the first differential mechanism PL1 rotate as a unit. Namely, the carrier C2 of the second differential mechanism PL2 rotates at the same rotational speed as the engine 5, and functions as an input element. With reaction torque transmitted from the first motor 6 to the sun gear S2 of the second differential mechanism PL2, torque is delivered from the ring gear R2 of the second differential mechanism PL2. Namely, the sun gear S2 functions as a reaction force element, and the ring gear R2 functions as an output element. In the HV-Hi mode, when torque transmitted to the first motor 6 side, out of torque delivered from the engine 5, is regarded as "1", the proportion of torque transmitted to the ring gear R2 is expressed as "$1/\rho 4$". Here, the ratio of the number of teeth of the ring gear R1 and the number of teeth of the sun gear S1 is denoted as "$\rho 3$", and the ratio of the number of teeth of the ring gear R2 and the number of teeth of the sun gear S2 is denoted as "$\rho 4$".

Figure 28:
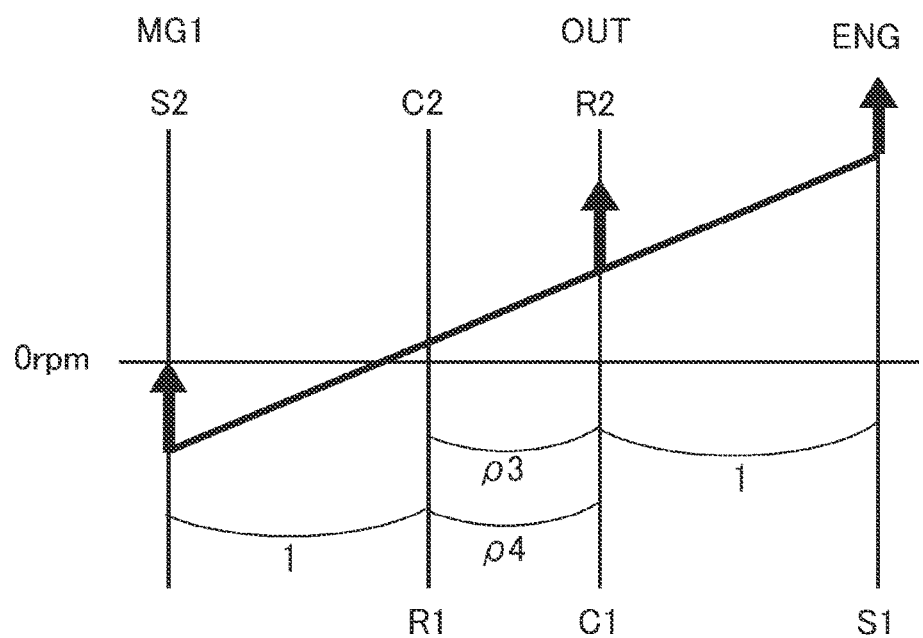
FIG. 28 is a nomographic chart illustrating operating conditions of each rotating element when the vehicle shown in FIG. 26 is placed in the HV-Lo mode.

FIG. 28 shows a nomographic chart illustrating operating conditions of respective rotating elements when the vehicle of FIG. 26 is placed in the HV-Lo mode. As shown in FIG. 28, in the HV-Lo mode, the fifth clutch mechanism CL5 is engaged. Accordingly, the carrier C1 of the first differential mechanism PL1 and the ring gear R2 of the second differential mechanism PL2 rotate as a unit. Also, the ring gear R1 of the first differential mechanism PL1 is coupled to the carrier C2 of the second differential mechanism PL2, as described above. Accordingly, the sun gear S1 of the first differential mechanism PL1 functions as an input element, and the sun gear S2 of the second differential mechanism PL2 functions as a reaction force element, while the ring gear R2 of the second differential mechanism PL2 functions as an output element. As a result, torque of the sun gear S1 of the first differential mechanism PL1 is transmitted to the ring gear R2 of the second differential mechanism PL2. In the HV-Lo mode, when torque transmitted to the first motor 6 side, out of torque delivered from the engine 5, is regarded as "1", the proportion of torque transmitted to the ring gear R2 is expressed as "$1+\rho 3+(\rho 3/\rho 4)$". Namely, in the HV-Lo mode, the proportion of torque transmitted from the engine 5 to the ring gear R2 is larger than that in the HV-Hi mode.

The vehicle shown in FIG. 26 is placed in the HV-Hi mode when one of the fourth clutch mechanism CL4 and the fifth clutch mechanism CL5 is engaged, and is placed in the HV-Lo mode when the other is engaged. Further, the direct-coupling mode is established when both of the fourth clutch mechanism CL4 and the fifth clutch mechanism CL5 are engaged. Accordingly, like the vehicle shown in FIG. 1, it may be preferable to switch the vehicle between the HV-Hi mode and the HV-Lo mode, without going through the direct-coupling mode.

Figure 29:
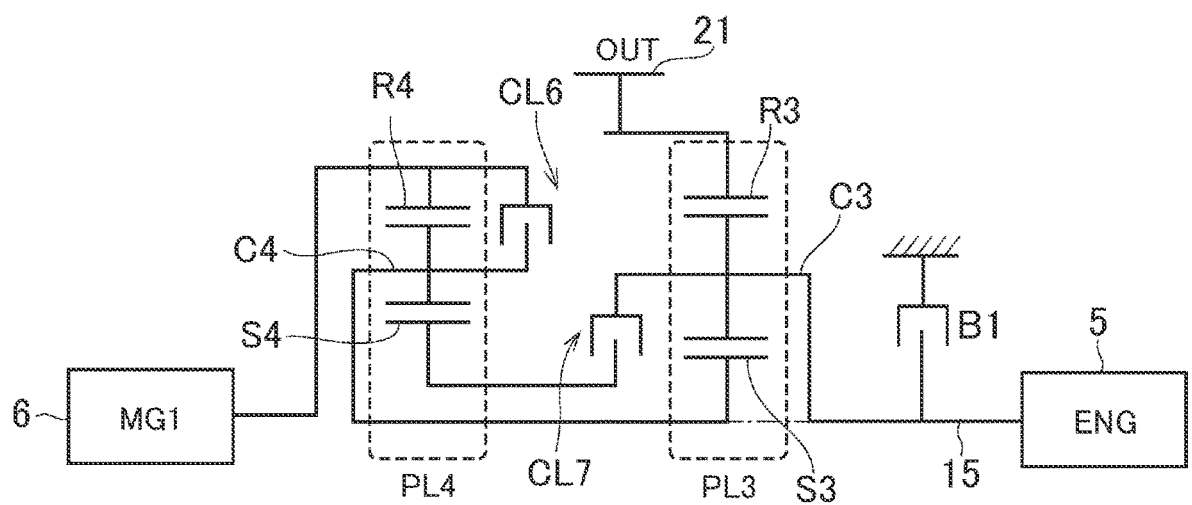
FIG. 29 is a skeleton diagram illustrating a still another configuration of a vehicle to which the disclosure can be applied.

FIG. 29 is a skeleton diagram illustrating a still another configuration of a vehicle according to one embodiment of the disclosure. The vehicle shown in FIG. 29 includes a third differential mechanism PL3 to which the engine 5 is directly coupled, and a fourth differential mechanism PL4 to which the first motor 6 is directly coupled.

The third differential mechanism PL3 is in the form of a single pinion type planetary gear mechanism including a carrier C3 coupled to the output shaft 15 of the engine 5, a sun gear S3, and a ring gear R3 coupled to the output gear 21. As in the example shown in FIG. 1, the driven gear 23 is coupled to the output gear 21, so that torque can be transmitted to the front wheels 1R, 1L.

The fourth differential mechanism PL4 is in the form of a single pinion type planetary gear mechanism including a ring gear R4 coupled to the first motor 6, a carrier C4 coupled to the sun gear S3 of the third differential mechanism PL3, and a sun gear S4.

The vehicle shown in FIG. 29 further includes a sixth clutch mechanism CL6 configured to engage the carrier C4 with the ring gear R4 in the fourth differential mechanism PL4, so that the rotating elements that constitute the fourth differential mechanism PL4 rotate as a unit, and a seventh clutch mechanism CL7 configured to engage the carrier C3 of the third differential mechanism PL3 with the sun gear S4 of the fourth differential mechanism PL4. The brake mechanism B1 is provided on the output shaft 15 of the engine 5. Like the first clutch mechanism CL1 and the second clutch mechanism CL2, the sixth clutch mechanism CL6 and the seventh clutch mechanism CL7 may be friction type clutch mechanisms, or mesh type clutch mechanisms.

The vehicle as described above can be placed in the HV-Lo mode in which the proportion of torque transmitted to the ring gear R3 is large, by engaging the seventh clutch mechanism CL7, and can be placed in the HV-Hi mode in which the proportion of torque transmitted to the ring gear R3 is small, by engaging the sixth clutch mechanism CL6.

Figure 30:
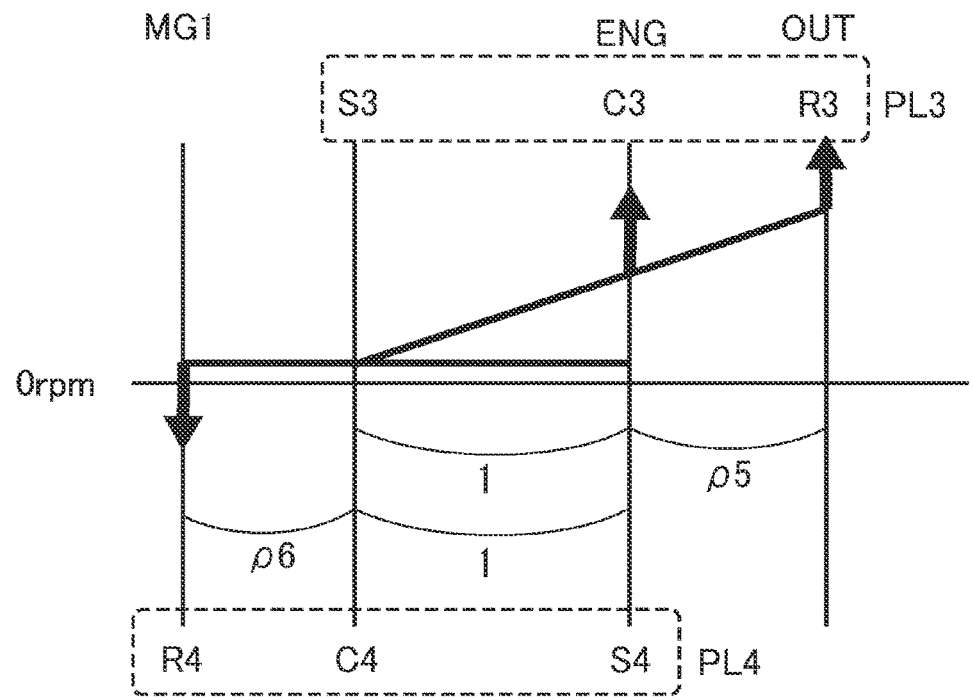
FIG. 30 is a nomographic chart illustrating operating conditions of each rotating element when the vehicle shown in FIG. 29 is placed in the HV-Hi mode.

FIG. 30 is a nomographic chart illustrating operating conditions of respective rotating elements when the vehicle of FIG. 29 is placed in the HV-Hi mode. As shown in FIG. 30, in the HV-Hi mode, the sixth clutch mechanism CL6 is engaged. Accordingly, the rotating elements that constitute the fourth differential mechanism PL4 rotate as a unit. Namely, torque of the first motor 6 is transmitted as it is to the carrier C4 of the fourth differential mechanism PL4. Then, torque is applied from the engine 5 to the carrier C3 of the third differential mechanism PL3, and reaction torque is transmitted from the first motor 6 to the sun gear S3 of the third differential mechanism PL3 via the carrier C4 of the fourth differential mechanism PL4, so that torque is delivered from the ring gear R3 of the third differential mechanism PL3. Namely, the carrier C3 of the third differential mechanism PL3 functions as an input element, and the sun gear S3 functions as a reaction force element, while the ring gear R3 functions as an output element. In the HV-Hi mode, when torque transmitted to the first motor 6 side, out of torque delivered from the engine 5, is regarded as "1", the proportion of torque transmitted to the ring gear R3 is expressed as "$1/\rho 5$". Here, "$\rho 5$" denotes the ratio of the number of teeth of the ring gear R3 and the number of teeth of the sun gear S3.

Figure 31:
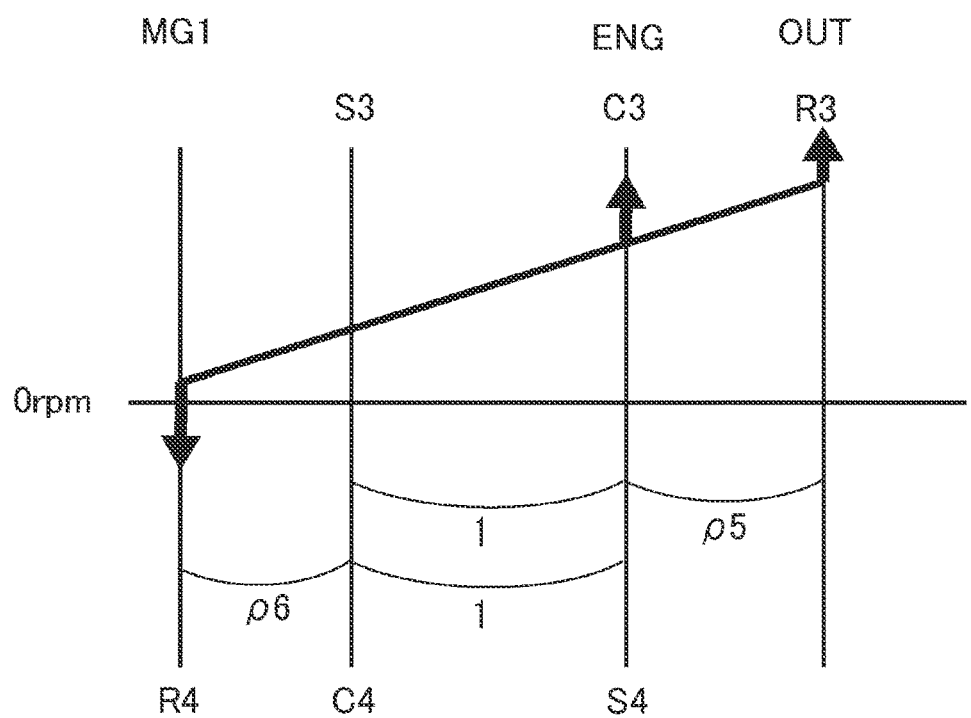
FIG. 31 is a nomographic chart illustrating operating conditions of each rotating element when the vehicle shown in FIG. 29 is placed in the HV-Lo mode.

FIG. 31 shows a nomographic chart illustrating operating conditions of respective rotating elements when the vehicle of FIG. 29 is placed in the HV-Lo mode. As shown in FIG. 31, in the HV-Lo mode, the seventh clutch mechanism CL7 is engaged. Accordingly, the carrier C3 of the third differential mechanism PL3 and the sun gear S4 of the fourth differential mechanism PL4 rotate as a unit. Also, the sun gear S3 of the third differential mechanism PL3 is coupled with the carrier C4 of the fourth differential mechanism PL4, as described above. Accordingly, the carrier C3 of the third differential mechanism PL3 functions as an input element, and the ring gear R4 of the fourth differential mechanism PL4 functions as a reaction force element, while the ring gear R3 of the third differential mechanism PL3 functions as an output element. As a result, torque of the carrier C3 of the third differential mechanism PL3 is transmitted to the ring gear R3 of the third differential mechanism PL3. In the HV-Lo mode, when torque transmitted to the first motor 6 side, out of torque delivered from the engine 5, is regarded as "1", the proportion of torque transmitted to the ring gear R3 is expressed as "$(1+\rho 6)/\rho 5$". Here, "$\rho 6$" is the ratio of the number of teeth of the ring gear R4 and the number of teeth of the sun gear S4. Accordingly in the HV-Lo mode, the proportion of torque transmitted from the engine 5 to the ring gear R3 is larger than that in the HV-Hi mode. Also, the speed reduction ratio as the ratio of the engine speed to the rotational speed of the ring gear R3 in the case where the rotational speed of the first motor 6 is "0" is larger in the HV-Lo mode, than that in the HV-Hi mode.

The vehicle shown in FIG. 29 is placed in the HV-Hi mode when one of the sixth clutch mechanism CL6 and the seventh clutch mechanism CL7 is engaged, and is placed in the HV-Lo mode when the other is engaged. Further, the direct-coupling mode is established when both of the sixth clutch mechanism CL6 and the seventh clutch mechanism CL7 are engaged. Accordingly, as in the vehicle shown in FIG. 1, it may be preferable to switch the vehicle between the HV-Hi mode and the HV-Lo mode, without going through the direct-coupling mode.

The configurations of the vehicles shown in FIG. 1, FIG. 26, and FIG. 29 will be comprehensively illustrated as follows. Namely, the vehicle includes a differential mechanism that consists of a first differential mechanism that has at least three rotating members including a first rotating member to which an engine is coupled, a second rotating member to which a rotating machine is coupled, and a third rotating member to which drive wheels are coupled, and performs differential operation using a first rotating element as one of the three rotating members, a second rotating element as another one of the three rotating members, and a third rotating element, and a second differential mechanism that performs differential operation using a fourth rotating element as a still another one of the three rotating members, a fifth rotating element coupled to the third rotating element, and a sixth rotating element, a first engagement mechanism that couples the sixth rotating element with the first rotating element or the second rotating element, or releases the coupling, and a second engagement mechanism that couples at least two rotating elements of the first rotating element, the second rotating element, and the third rotating element, or at least two rotating elements of the fourth rotating element, the fifth rotating element, and the sixth rotating element, or releases the coupling. The vehicle is able to set a first mode (HV-Lo mode) in which the proportion of torque transmitted from the engine to drive wheels is relatively large, by engaging one of the first engagement mechanism and the second engagement mechanism, set a second mode (HV-Hi mode) in which the proportion of torque transmitted from the engine to drive wheels is relatively small, by engaging the other of the first engagement mechanism and the second engagement mechanism, and set a direct-coupling mode by engaging the first engagement mechanism and the second engagement mechanism. The vehicle thus configured is included in vehicles according to embodiments of the disclosure.

What is claimed is:

1. A vehicle operated by a driver comprising:
    an engine;
    drive wheels;
    a first rotating machine;
    a transmission mechanism including:
        a plurality of rotating elements including a first rotating element coupled to the engine, a second rotating element coupled to the first rotating machine, and a third rotating element coupled to the drive wheels such that the third rotating element is able to transmit torque to the drive wheels,
        a first engagement mechanism configured to selectively couple two rotating elements of the plurality of rotating elements, and
        a second engagement mechanism configured to selectively couple two rotating elements of the plurality of rotating elements; and
    an electronic control unit configured to control the engine, the first rotating machine, the first engagement mechanism, and the second engagement mechanism,
    the electronic control unit configured to set a low mode by controlling the first engagement mechanism to an engaged state, and controlling the second engagement mechanism to a released state, the low mode is a mode in which a torque proportion is equal to a first predetermined value, the torque proportion being a proportion of torque transmitted to the third rotating element to torque output from the engine;
    the electronic control unit configured to set a high mode by controlling the second engagement mechanism to an engaged state, and controlling the first engagement mechanism to a released state, the high mode is a mode in which the torque proportion is equal to a second predetermined value that is smaller than the first predetermined value,
    the electronic control unit configured to set a direct-coupling mode by controlling the first engagement mechanism and the second engagement mechanism to the engaged state, the direct-coupling mode is a mode in which differential operation of the plurality of rotating elements is restricted,
    the electronic control unit configured to perform first switching control when there is a request for switching from the low mode to the high mode, the first switching control including
    i) releasing the first engagement mechanism,
    ii) controlling the engine to a first predetermined rotational speed,
    iii) controlling a rotational speed of the first rotating machine such that a difference between an input rotational speed and an output rotational speed of the second engagement mechanism becomes equal to or smaller than a first permissible value, and
    iv) switching the second engagement mechanism to the engaged state, when the difference between the input rotational speed and the output rotational speed of the second engagement mechanism is equal to or smaller than the first permissible value; and
    the electronic control unit configured to perform second switching control when there is a request for switching from the high mode to the low mode, the second switching control including
    v) releasing the second engagement mechanism,
    vi) controlling the engine to a second predetermined rotational speed,
    vii) controlling the rotational speed of the first rotating machine such that a difference between an input rotational speed and an output rotational speed of the first engagement mechanism becomes equal to or smaller than a second permissible value, and
    viii) switching the first engagement mechanism to the engaged state, when the difference between the input rotational speed and the output rotational speed of the first engagement mechanism is equal to or smaller than the second permissible value.

2. The vehicle according to claim 1, wherein
    the electronic control unit is configured to perform switching between the low mode and the high mode without going through the direct-coupling mode, when a vehicle speed is equal to or lower than a first predetermined vehicle speed.

3. The vehicle according to claim 2, wherein
    the first predetermined vehicle speed includes a vehicle speed at which the engine is unable to rotate by itself when the direct-coupling mode is set.

4. The vehicle according to claim 3, wherein
    the first predetermined vehicle speed includes a vehicle speed at which a rotational speed of the engine becomes equal to or higher than a natural frequency of the transmission mechanism when the direct-coupling mode is set.

5. The vehicle according to claim 2, wherein
    the first predetermined rotational speed and the second predetermined rotational speed of the engine include an idle speed.

6. The vehicle according to claim 1, wherein
the electronic control unit is configured to perform switching between the low mode and the high mode without going through the direct-coupling mode, when a vehicle speed is equal to or higher than a second predetermined vehicle speed.

7. The vehicle according to claim 6, wherein
the second predetermined vehicle speed includes a vehicle speed at which the rotational speed of the engine is required to vary according to a required driving force required of the vehicle by the driver, when the driver changes the required driving force.

8. The vehicle according to claim 7, wherein
the first predetermined rotational speed and the second predetermined rotational speed of the engine change according to the required amount of the driving force.

9. The vehicle according to claim 7, wherein
the required driving force includes an operation amount of an accelerator adapted to be operated by the driver, and required power that is required of the vehicle.

10. The vehicle according to claim 7, wherein
the electronic control unit is configured to perform switching between the low mode and the high mode without going through the direct-coupling mode, when the required driving force is equal to or smaller than a predetermined driving force.

11. The vehicle according to claim 10, further comprising a second rotating machine coupled to the drive wheels such that the second rotating machine is able to transmit torque to the drive wheels, wherein
the predetermined driving force is equal to or smaller than driving force that is satisfied when a maximum torque is output from the second rotating machine.

12. The vehicle according to claim 11, further comprising a power storage device configured to supply electric power to the second rotating machine, wherein
the maximum torque able to be output from the second rotating machine is determined based on permissible operating conditions including a temperature condition of the power storage device and a temperature condition of the second rotating machine.

13. The vehicle according to claim 7, wherein
the electronic control unit is configured to perform switching between the low mode and the high mode without going through the direct-coupling mode, when the low mode is restricted from being set.

14. The vehicle according to claim 1, wherein
the electronic control unit is configured to perform switching between the low mode and the high mode without going through the direct-coupling mode, when a required driving force required of the vehicle by the driver is equal to or smaller than a predetermined driving force.

15. The vehicle according to claim 14, further comprising a second rotating machine coupled to the drive wheels such that the second rotating machine is able to transmit torque to the drive wheels, wherein
the predetermined driving force is equal to or smaller than driving force that is satisfied when a maximum torque is output from the second rotating machine.

16. The vehicle according to claim 15, further comprising a power storage device configured to supply electric power to the second rotating machine, wherein
the maximum torque able to be output from the second rotating machine is determined based on permissible operating conditions including a temperature condition of the power storage device and a temperature condition of the second rotating machine.

17. The vehicle according to claim 1, wherein
the electronic control unit is configured to perform switching between the low mode and the high mode without going through the direct-coupling mode, when the low mode is restricted from being set.

18. A method of controlling a vehicle, the vehicle including an engine, drive wheels, a first rotating machine, a transmission mechanism including a plurality of rotating elements, and an electronic control unit,
the plurality of rotating elements including a first rotating element coupled to the engine, a second rotating element coupled to the first rotating machine, and a third rotating element coupled to the drive wheels such that the third rotating element is able to transmit torque to the drive wheels,
the transmission mechanism including a first engagement mechanism configured to selectively couple two rotating elements of the plurality of rotating elements, and a second engagement mechanism configured to selectively couple two rotating elements of the plurality of rotating elements,
the electronic control unit being configured to control the engine, the first rotating machine, the first engagement mechanism, and the second engagement mechanism,
the electronic control unit being configured to set a low mode by controlling the first engagement mechanism to an engaged state and controlling the second engagement mechanism to a released state, the low mode is a mode in which a torque proportion is equal to a first predetermined value, the torque proportion being proportion of torque transmitted to the third rotating element to torque output from the engine,
the electronic control unit being configured to set a high mode by controlling the second engagement mechanism to an engaged state and controlling the first engagement mechanism to a released state, the high mode is a mode in which the torque proportion is equal to a second predetermined value that is smaller than the first predetermined value,
the electronic control unit being configured to set a direct-coupling mode by controlling the first engagement mechanism and the second engagement mechanism to the engaged state, the direct-coupling mode is a mode in which differential operation of the plurality of rotating elements is restricted,
the method comprising:
a) performing following control i) to iv) by the electronic control unit when there is a request for switching from the low mode to the high mode;
i) releasing the first engagement mechanism,
ii) controlling the engine to a first predetermined rotational speed,
iii) controlling a rotational speed of the first rotating machine such that a difference between an input rotational speed and an output rotational speed of the second engagement mechanism becomes equal to or smaller than a first permissible value, and
iv) switching the second engagement mechanism to the engaged state, when the difference between the input rotational speed and the output rotational speed of the second engagement mechanism is equal to or smaller than the first permissible value; and
b) performing following control v) to viii) by the electronic control unit when there is a request for switching from the high mode to the low mode, v) releasing the second engagement mechanism,
vi) controlling the engine to a second predetermined rotational speed,
vii) controlling the rotational speed of the first rotating machine such that a difference between an input rotational speed and an output rotational speed of the first engagement mechanism becomes equal to or smaller than a second permissible value, and
viii) switching the first engagement mechanism to the engaged state, when the difference between the input rotational speed and the output rotational speed of the first engagement mechanism is equal to or smaller than the second permissible value.

\* \* \* \* \*